(12) United States Patent
Jeong et al.

(10) Patent No.: US 9,941,749 B2
(45) Date of Patent: Apr. 10, 2018

(54) NON-CONTACT TYPE CHARGER

(71) Applicant: Samsung Electro-Mechanics Co., Ltd., Suwon-si (KR)

(72) Inventors: In Wha Jeong, Suwon-si (KR); Jong Heum Park, Suwon-si (KR); Hugh Kim, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 190 days.

(21) Appl. No.: 14/723,538

(22) Filed: May 28, 2015

(65) Prior Publication Data

US 2016/0079798 A1    Mar. 17, 2016

(30) Foreign Application Priority Data

Sep. 11, 2014 (KR) .................. 10-2014-0120452

(51) Int. Cl.
*H02J 7/00* (2006.01)
*H02J 50/40* (2016.01)

(52) U.S. Cl.
CPC .................. *H02J 50/40* (2016.02)

(58) Field of Classification Search
CPC .. H02J 50/40; H02J 7/025; H02J 17/00; H02J 5/00; H02J 5/005; H02J 50/00; H02J 50/10; H02J 50/12; H02J 50/50; H02J 50/60; H02J 50/70; H02J 50/80; H02J 50/90
USPC .......................................... 320/108; 307/104
See application file for complete search history.

(56) References Cited

U.S. PATENT DOCUMENTS

| 2012/0217818 A1* | 8/2012 | Yerazunis | H02J 5/005 307/104 |
| 2013/0127405 A1* | 5/2013 | Scherer | H02J 7/025 320/108 |
| 2013/0147280 A1* | 6/2013 | Oettinger | H01F 38/14 307/104 |
| 2014/0009109 A1* | 1/2014 | Lee | H02J 17/00 320/108 |
| 2014/0084688 A1* | 3/2014 | Tzanidis | H01F 38/14 307/42 |
| 2014/0300196 A1* | 10/2014 | Bunsen | H02J 7/025 307/104 |
| 2016/0025477 A1* | 1/2016 | Madau | H02J 7/025 320/108 |

FOREIGN PATENT DOCUMENTS

| EP | 2787596 A2 * | 10/2014 | ............ H02J 17/00 |
| KR | 10-2013-0054897 A | 5/2013 | |
| KR | 10-2014-0007273 A | 1/2014 | |

* cited by examiner

*Primary Examiner* — Drew A Dunn
*Assistant Examiner* — Michael Dibenedetto
(74) *Attorney, Agent, or Firm* — NSIP Law

(57) ABSTRACT

There is provided a non-contact type charger including: a plurality of power transmitting coils transmitting power in a non-contact manner; a plurality of switching units connected to the plurality of power transmitting coils, respectively, to switch power transmitted by corresponding power transmitting coils; and a switching control unit controlling power switching of the switching units, depending on coupling coefficients between each of the plurality of power transmitting coils and a plurality of power receiving coils which receive the power transmitted by the plurality of power transmitting coils to charge a plurality of battery cells connected thereto with power.

14 Claims, 28 Drawing Sheets

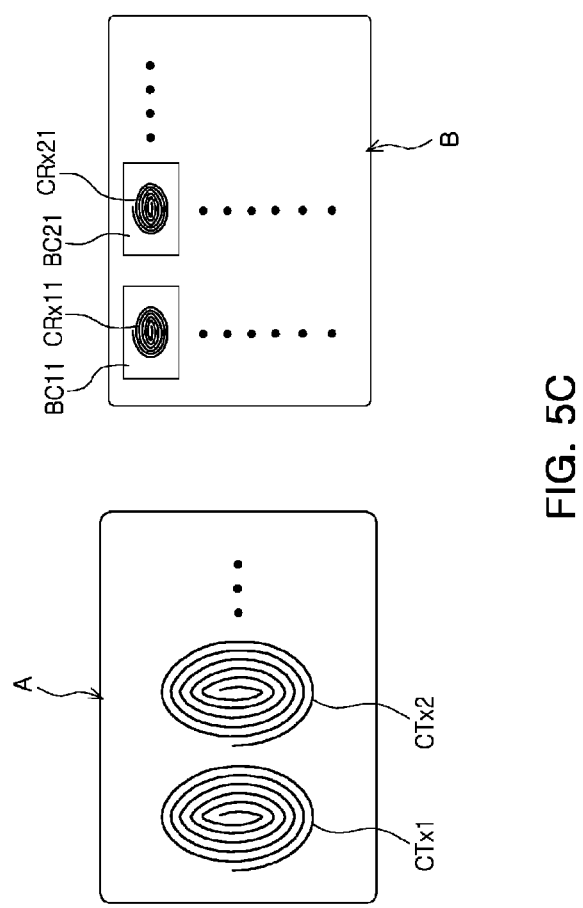

| Tx1 | Tx2 |
|-----|-----|
| on | off |
| off | on |

FIG. 8A

| Tx1 | Tx2 |
|-----|-----|
| VARIED | FIXED |
| FIXED | VARIED |

FIG. 8B

NON-CONTACT TYPE CHARGER

CROSS-REFERENCE TO RELATED APPLICATION

This application claims the priority and benefit of Korean Patent Application No. 10-2014-0120452 filed on Sep. 11, 2014, with the Korean Intellectual Property Office, the disclosure of which is incorporated herein by reference.

BACKGROUND

The present disclosure relates to a non-contact type charger for charging a battery cell with power in a non-contact manner.

Electronic devices are operated using electricity as an energy source.

Electrical power as an energy source needs to be supplied to electronic devices in order for the electronic devices to operate. Electronic devices may generate power using a self-generation scheme, or receive power supplied by external power sources.

In order for electronic devices to receive power supplied by external power sources, a power supply may be required to transfer power from power supply facilities to the electronic devices.

A contact-type power supply device, which is directly connected to an electronic device through a connector, or the like, is commonly used to supply power to a rechargeable battery provided in an electronic device. Alternately, power may be supplied to a battery provided in an electronic device in a non-contact manner, as detailed in the following Related Art Document.

However, the following Related Art Document does not disclose techniques for obtaining balance between power levels in a plurality of battery cells of a single battery and significantly increasing effective currents of the battery cells in a case in which power is applied to the battery in a non-contact manner.

RELATED ART DOCUMENT (Patent Document 1) Korean Patent Laid-Open Publication No. 10-2013-0054897

SUMMARY

An aspect of the present disclosure may provide a non-contact type charger for controlling charging power provided to a plurality of battery cells in a non-contact manner, depending on coupling coefficients between power transmitting coils and power receiving coils.

According to an aspect of the present disclosure, a non-contact type charger may include: a plurality of power transmitting coils transmitting power in a non-contact manner; a plurality of switching units connected to the plurality of power transmitting coils, respectively, to switch power transmitted by corresponding power transmitting coils; and a switching control unit controlling power switching of the switching units, depending on coupling coefficients between each of the plurality of power transmitting coils and a plurality of power receiving coils which receive the power transmitted by the plurality of power transmitting coils to charge a plurality of battery cells connected thereto with the power.

According to another aspect of the present disclosure, a non-contact type charger may include: a plurality of power transmitting units each including: a power unit supplying direct current (DC) power, a switching unit switching the DC power supplied by the power unit, a power transmitting coil transmitting the power in a non-contact manner, depending on the power switching of the switching unit, a detecting unit detecting a power state change of the power transmitting coil, and a control unit controlling the power switching of the switching unit by setting a coupling coefficient between the power transmitting coil and a power receiving coil, depending on a detection result of the detecting unit.

BRIEF DESCRIPTION OF DRAWINGS

The above and other aspects, features and advantages of the present disclosure will be more clearly understood from the following detailed description taken in conjunction with the accompanying drawings, in which:

FIGS. 5A through 5C are views illustrating examples and applications of a battery according to exemplary embodiments of the present disclosure;

FIGS. 6A through 6D, FIGS. 7A through 7D, and FIGS. 8A and 8B are views illustrating examples of a power charging operation according to exemplary embodiments in the present disclosure;

DETAILED DESCRIPTION

Figure 1A:
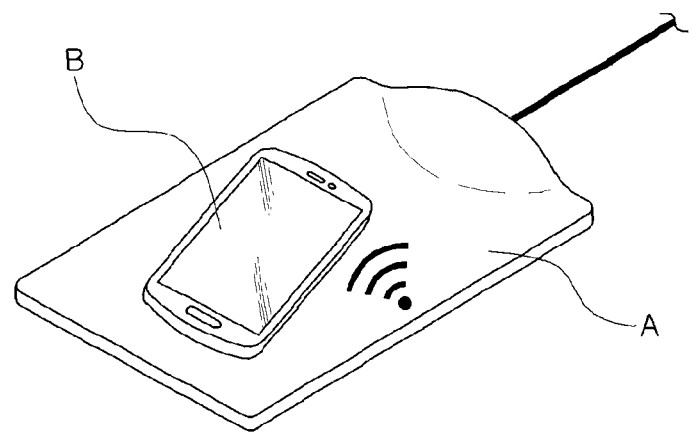
FIGS. 1A and 1B are views illustrating applications of a charger according to an exemplary embodiment in the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 1B:
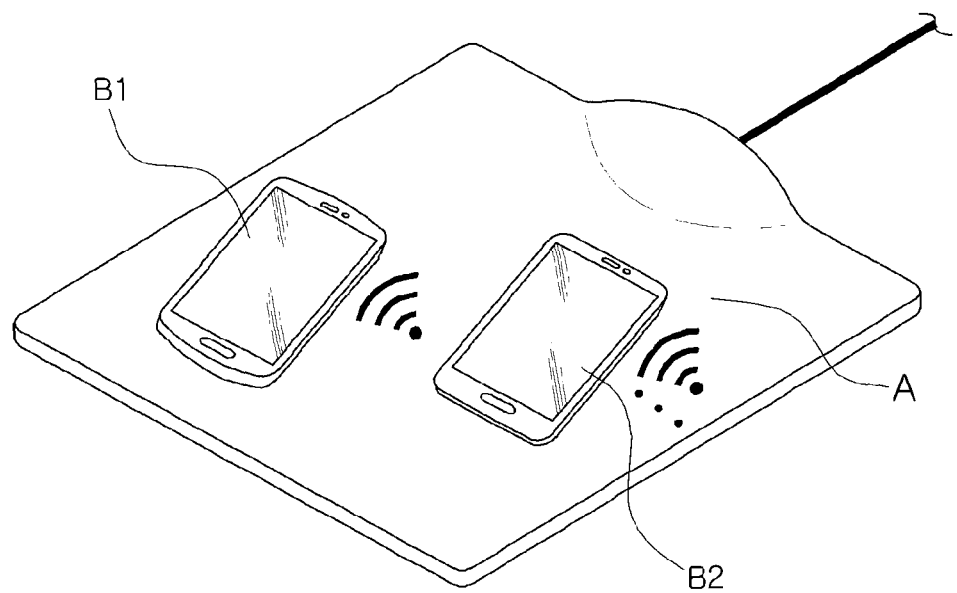

FIGS. 1A and 1B are views illustrating applications of a charger according to an exemplary embodiment in the present disclosure.

Referring to FIGS. 1A and 1B, a charger A according to an exemplary embodiment of the present disclosure may transmit power to one or more electronic devices, such as a cellular phone, a tablet personal computer (PC), a laptop PC, or the like, including a battery B having a plurality of battery cells, in a non-contact manner. In addition, the charger A according to the exemplary embodiment may transmit power to a plurality of cellular phones, tablet PCs, laptop PCs, or the like, having batteries B1 and B2 in the non-contact manner (here, the non-contact manner may refer to a scheme in which a direct connection is not made between conductors on a transmitting side and a receiving side in a process of transmitting power from the transmitting side to the receiving side, and may be called a contactless scheme, a wireless transmission scheme, or the like).

Figure 2A:
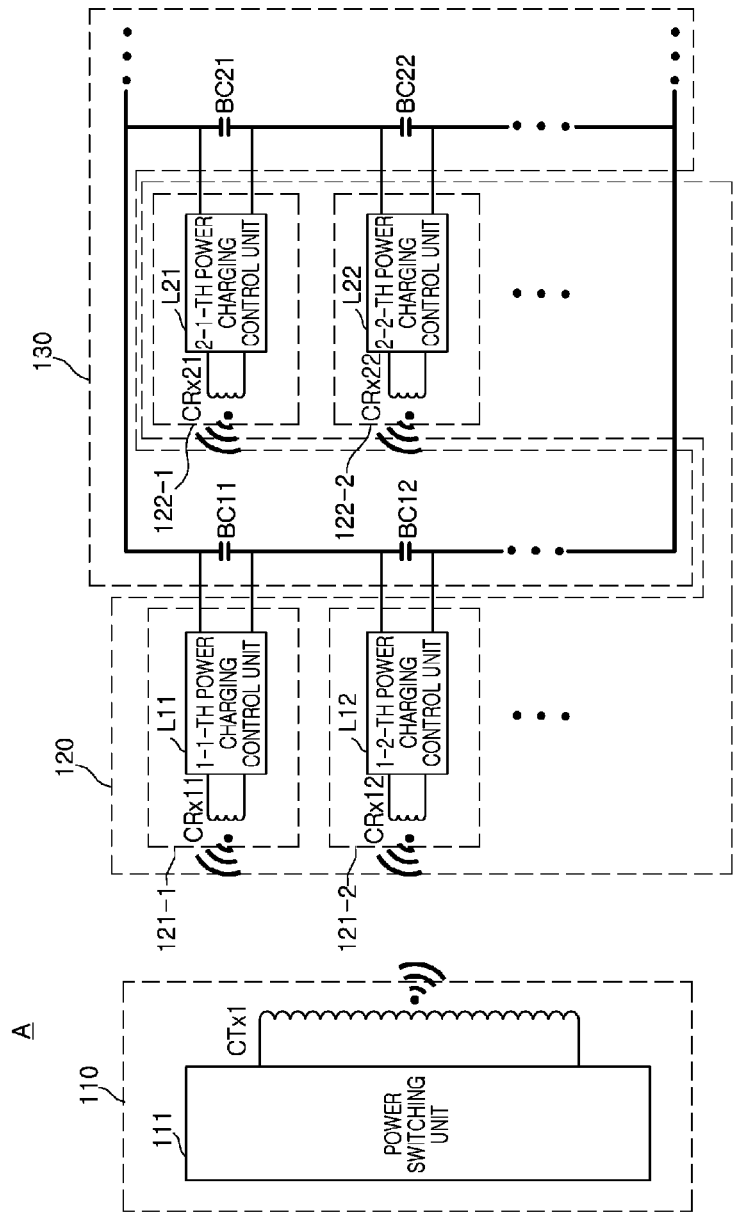
FIGS. 2A and 2B are circuit diagrams schematically illustrating examples of a charger and a battery according to exemplary embodiments in the present disclosure.
Figure 2B:
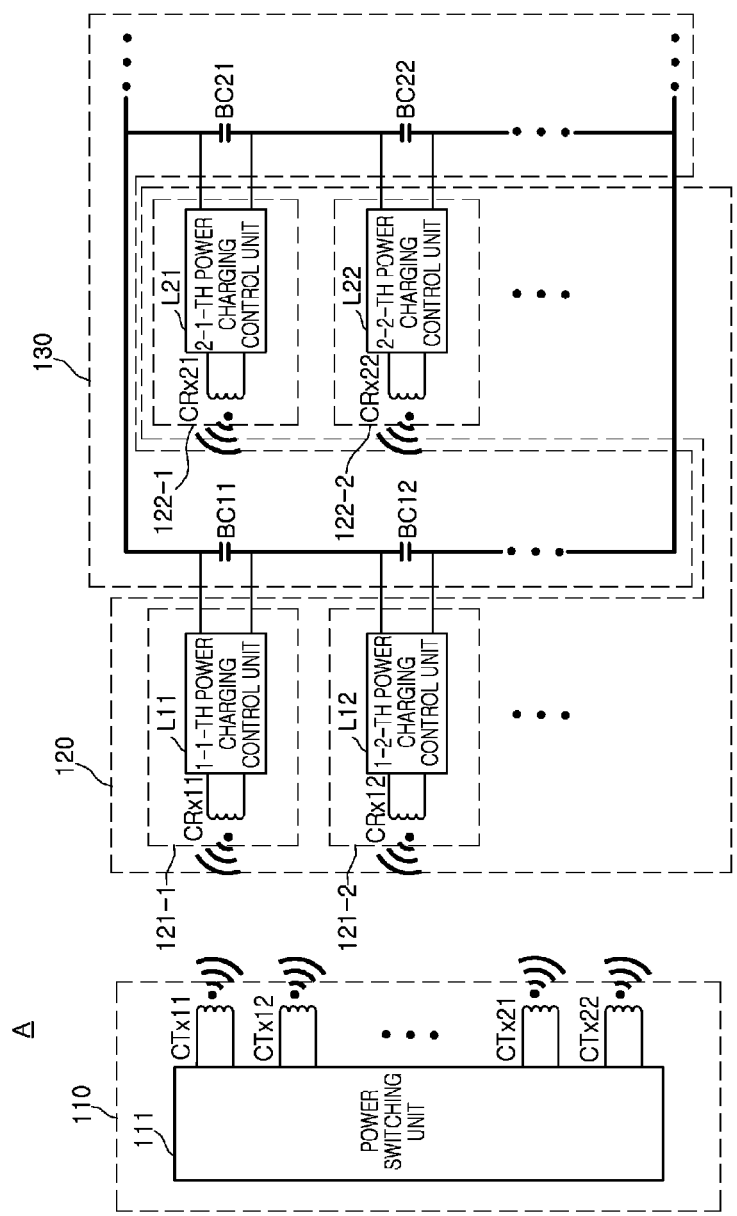

FIGS. 2A and 2B are circuit diagrams schematically illustrating examples of a charger and a battery according to exemplary embodiments in the present disclosure.

Referring to FIGS. 2A and 2B, the charger A according to the exemplary embodiments in the present disclosure may include a power supply unit 110 transmitting power in a non-contact manner. The power supply unit 110 may include a power converting unit 111 providing preset power and power transmitting coils CTx1, CTx11, CTx12, . . . , CTx21, and CTx22 transmitting the power from the power converting unit 111 in a non-contact manner.

The charger A may include a single power transmitting coil CTx1 as illustrated in FIG. 2A or may include a plurality of power transmitting coils CTx11, CTx12, . . . , CTx21, and CTx22 as illustrated in FIG. 2B in order to improve power transmission efficiency. The number of power transmitting coils CTx11, CTx12, . . . , CTx21, and CTx22 may correspond to the number of power receiving coils CRx11, CRx12, . . . , CRx21, and CRx22 disposed on a power receiving side.

Referring to FIGS. 2A and 2B, the battery B may include a power charging unit 120 and a battery unit 130. The power charging unit 120 may include a plurality of power charging units 121-1, 121-2, 122-1, and 122-2 corresponding to a plurality of battery cells BC11, BC12, BC21, and BC22 of the battery unit 130, respectively, and the plurality of power charging units 121-1, 121-2, 122-1, and 122-2 may include power receiving coils CRx11, CRx12, CRx21, and CRx22 and power charging control units L11, L12, L21, and L22, respectively, in order to charge corresponding battery cells BC11, BC12, BC21, and BC22 with power.

The power receiving coils CRx11, CRx12, CRx21, and CRx22 may receive the power from the power transmitting coils CTx1, CTx11, CTx12, . . . , CTx21, and CTx22 of the charger A in the non-contact manner, and the power charging control units L11, L12, L21, and L22 may charge the corresponding battery cells BC11, BC12, BC21, and BC22, with the power from the power receiving coils CRx11, CRx12, CRx21, and CRx22 and may control current values of the power charged in the corresponding battery cells BC11, BC12, BC21, and BC22. The power charged in the corresponding battery cells BC11, BC12, BC21, and BC22 may be controlled depending on coupling coefficients which are set between the power transmitting coils CTx1, CTx11, CTx12, . . . , CTx21, and CTx22 and the power receiving coils CRx11, CRx12, CRx21, and CRx22. The battery unit 130 may include at least one battery cell group, in which a plurality of battery cells are connected to each other in series, but is not limited thereto.

The coupling coefficients between the power transmitting coils and the power receiving coils will be described in detail with reference to FIGS. 9A and 9B.

Meanwhile, in a case in which the charger A and the battery B described above are configured as a single charger, the charger may function as the power transmitting device A and the power receiving device B.

Figure 3A:
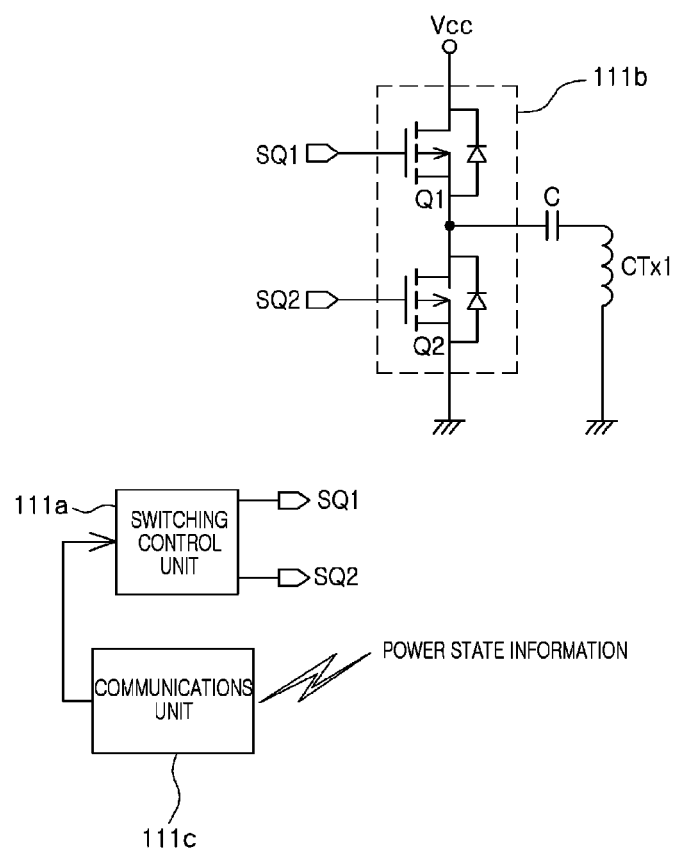
FIGS. 3A and 3B are circuit diagrams schematically illustrating examples of a power supply unit used in a charger according to exemplary embodiments in the present disclosure.
Figure 3B:
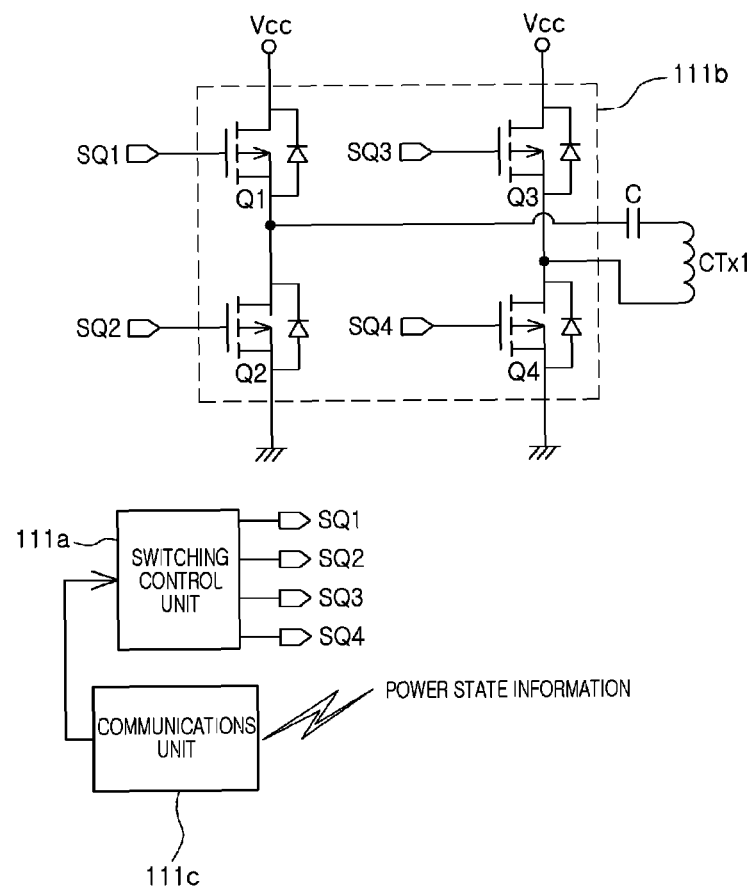
Figure 4A:
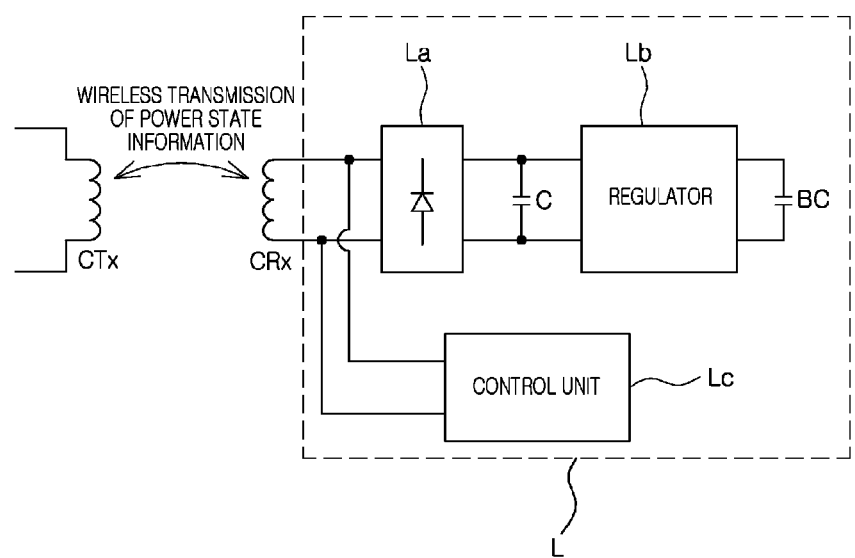
FIGS. 4A through 4D are circuit diagrams schematically illustrating first to fourth examples of a power charging unit according to exemplary embodiments in the present disclosure.
Figure 4B:
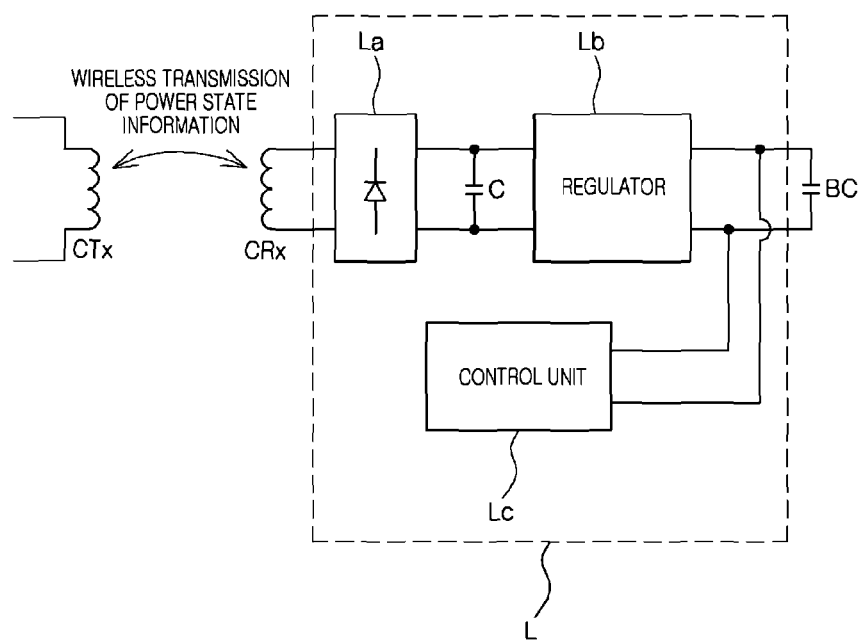
Figure 4C:
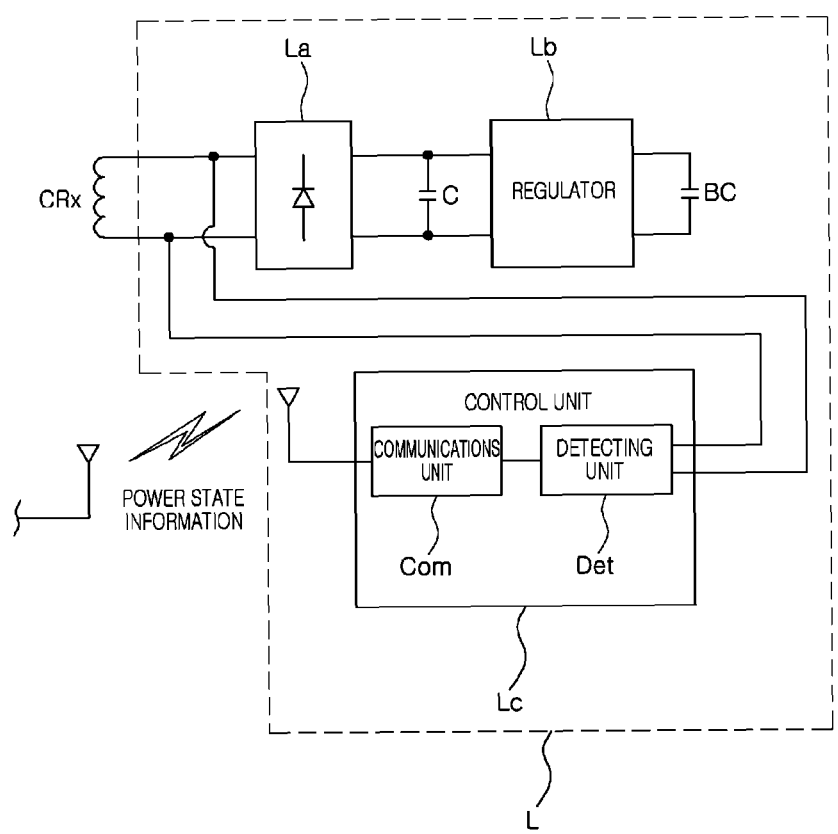
Figure 4D:
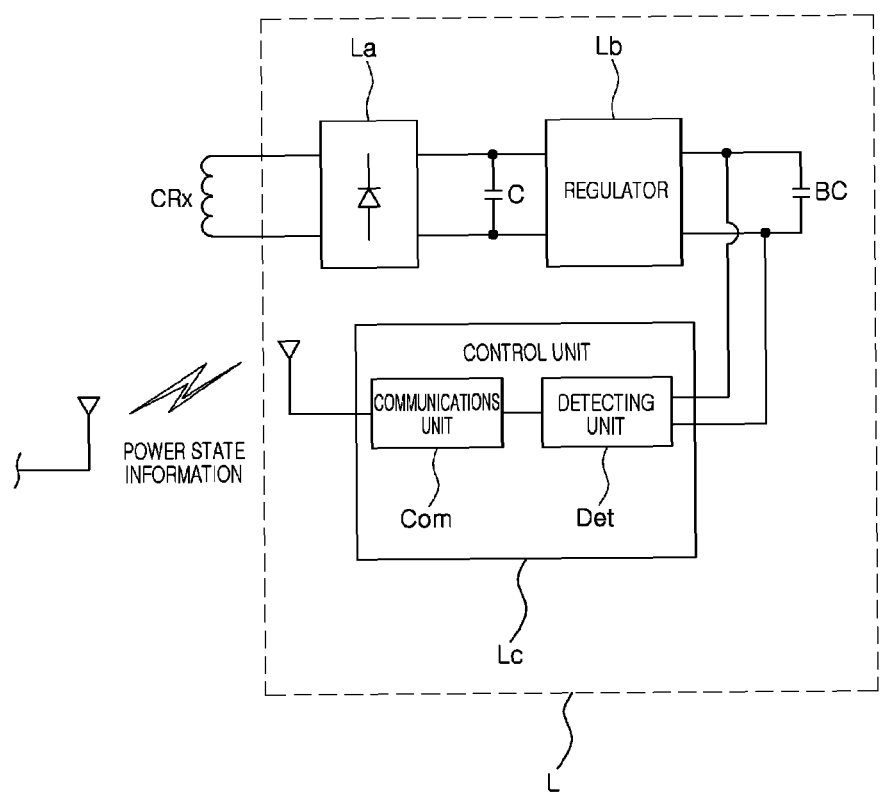

FIGS. 3A and 3B are circuit diagrams schematically illustrating examples of a power supply unit used in a charger according to exemplary embodiments in the present disclosure.

The power supply unit 110 may include the power converting unit 111 switching the power and a power transmitting coil CTx1. The power supply unit 110 may include a plurality of power transmitting coils.

The power converting unit 111 may include a switching unit 111b, a switching control unit 111a, and a communications unit 111c. The switching unit 111b may be electrically connected to the power transmitting coil CTx1, switch input power, and wirelessly transmit the power through the power transmitting coil CTx1. The switching control unit 111a may provide switching control signals SQ1 and SQ2, or SQ1 to SQ4, for controlling the switching operation of the switching unit 111b. In a case in which the power transmitting coil is provided in plural, a plurality of switching units may be connected to the plurality of power transmitting coils, respectively, or the plurality of power transmitting coils may be connected to at least one switching unit.

The communications unit 111c may receive charging state information from a wireless power charging target device and provide the charging state information to the switching control unit 111a so that the switching control unit 111a may control a switching duty, switching on/off times, and the like, thereby performing a rapid power charging function, a function of maintaining a power balance between battery cells, or the like.

The switching unit 111b may include at least two switches Q1 and Q2 as illustrated in FIG. 3A. For example, the switches Q1 and Q2 may be field effect transistors (FETs), but are not limited thereto. The switches Q1, Q2, Q3 and Q4 may have a half bridge structure or a full bridge structure as illustrated in FIG. 3B. However, the switches Q1, Q2, Q3 and Q4 are not limited thereto, and the configuration thereof may be variously modified. Driving power Vcc may be supplied to the switches Q1 and Q2. A voltage level of the supplied driving power Vcc may be fixed or varied.

FIGS. 4A through 4D are circuit diagrams schematically illustrating first to fourth examples of a power charging unit according to exemplary embodiments in the present disclosure.

Referring to FIGS. 4A through 4D, the power charging unit according to exemplary embodiments may include a power receiving coil CRx and a power charging control unit L.

The power receiving coil CRx may wirelessly receive power from a corresponding power transmitting coil CTx of the power supply unit. The power charging control unit L may control the wirelessly received power and charge a corresponding battery cell BC with the power.

The power charging control unit L may include a rectifying unit La, a regulator Lb, and a control unit Lc.

The rectifying unit La may rectify the power received from the power receiving coil CRx, and the regulator Lb may convert the rectified power into power appropriate for charging to control the power charging of the corresponding battery cell BC. The control unit Lc may detect a state of the power transmitted to the power receiving coil CRx and wirelessly transmit power state information to the power supply unit.

To this end, the control unit Lc may detect the state of the power from the power receiving coil CRx or the power provided from the regulator Lb to the battery cell BC.

Meanwhile, the control unit Lc may wirelessly transmit the power state information having a pulse form to a power transmitting side through the power receiving coil CRx, and may include a separate communications unit Com to transmit the power state information detected by a detecting unit Det to the power transmitting side through the communications unit Com in a preset communications scheme.

Figure 5A:
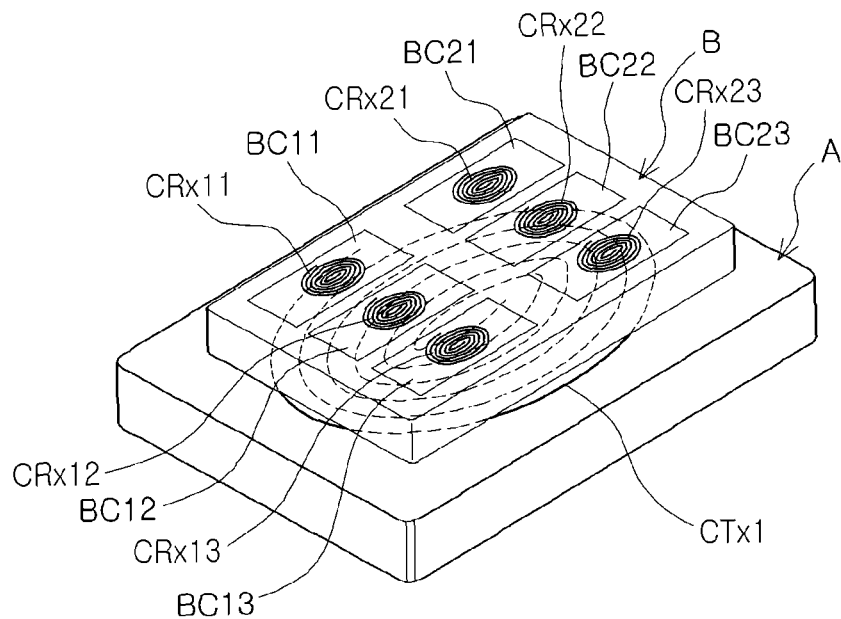
Figure 5B:
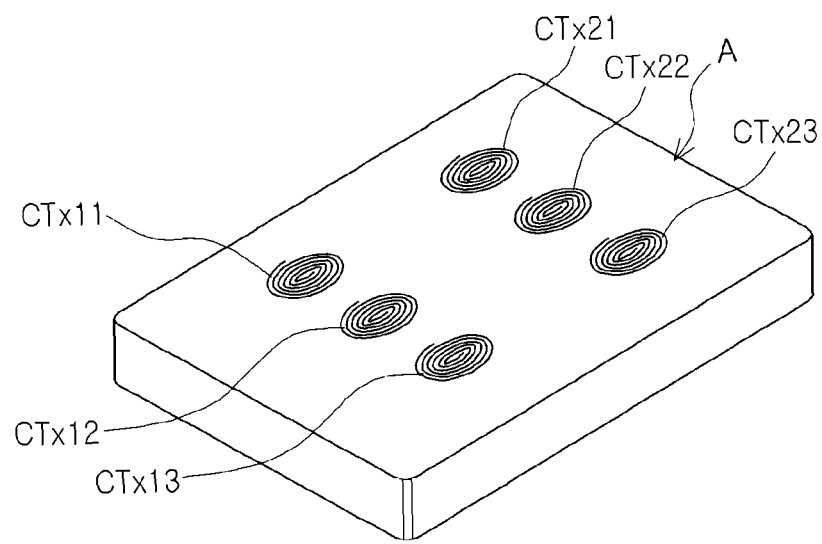

FIGS. 5A through 5C are views illustrating examples and applications of a battery according to exemplary embodiments in the present disclosure.

Referring to FIG. 5A, the battery B according to an exemplary embodiment in the present disclosure may include, for example, six battery cells BC11 to BC23. The six battery cells BC11 to BC23 may include three battery cells BC11, BC12, and BC13 and three battery cells BC21, BC22, and BC23, connected to each other in series, respectively, each of which forms a single battery cell group. Two battery cells groups BC11, BC12, and BC13 and BC21, BC22, and BC23 may be configured to be connected to each other in parallel (the battery B according to an exemplary embodiment in the present disclosure may be used in a cellular phone, a tablet PC, a laptop PC, or the like, but details thereof will be omitted).

In addition, as illustrated in FIG. 5A, six power receiving coils CRx11 to CRx23 corresponding to the six battery cells BC11 to BC23 may be provided in the battery B, and may wirelessly receive the power from one or more power transmitting coils of the charger A.

For example, the charger A may include a single power transmitting coil CTx1, as illustrated in FIG. 5A, or include a plurality of power transmitting coils as illustrated in FIG. 5B. For example, six power transmitting coils CTx11 to CTx23 corresponding to six power receiving coils CRx11 to CRx23 may be provided as illustrated in FIG. 5B, but the number of power transmitting coils is not limited to.

In addition, referring to FIG. 5C, the charger A may include a plurality of power transmitting coils CTx1 and CTx2, and the battery B may also include a plurality of power receiving coils CRx11 and CRx21, for example, six or more power receiving coils or less than six power receiving coils.

FIGS. 6A through 6D, FIGS. 7A through 7D, and FIGS. 8A and 8B are views illustrating examples of a power charging operation according to exemplary embodiments in the present disclosure.

Referring to FIGS. 6A through 6D, levels of voltages $V_{Rx1}$, $V_{Rx2}$, and $V_{Rx3}$ of power transferred to the power receiving coils may be different from each other. Therefore, the power supply unit may differently set the voltages $V_{Tx1}$, $V_{Tx2}$, and $V_{Tx3}$ of the power transmitted by the power transmitting coils to the corresponding power receiving coils in a balanced state depending on the power state information.

Figure 6A:
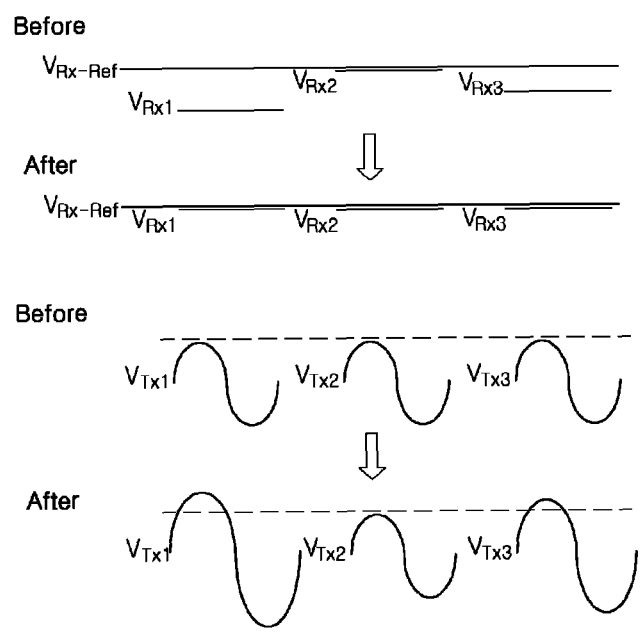

As illustrated in FIG. 6A, the power supply unit may maintain a balance in power levels by controlling the amounts of power received by the power receiving coils to be constant, on the basis of a maximum voltage $V_{Rx2}$ among the voltages $V_{Rx1}$, $V_{Rx2}$, and $V_{Rx3}$ received by the plurality of power receiving coils depending on the power state information from the power charging unit. On the contrary, as illustrated in FIG. 6D, the power supply unit may maintain a balance in power levels by controlling the amounts of power received by the power receiving coils to be constant on the basis of a minimum voltage $V_{Rx2}$ among the voltages $V_{Rx1}$, $V_{Rx2}$, and $V_{Rx3}$ received by the plurality of power receiving coils.

Figure 6B:
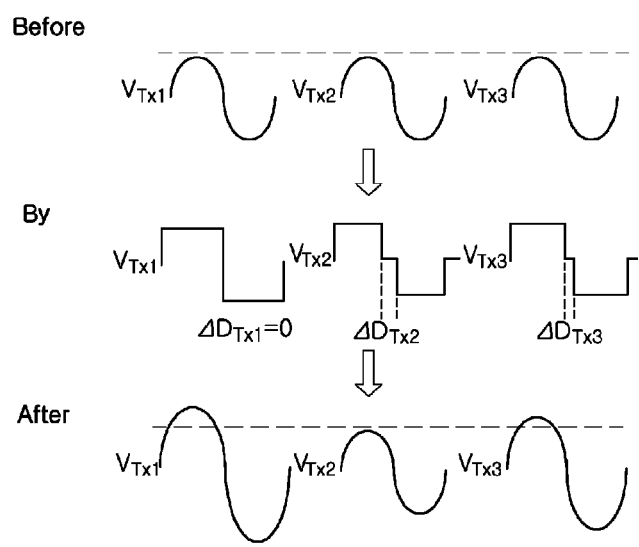
Figure 6C:
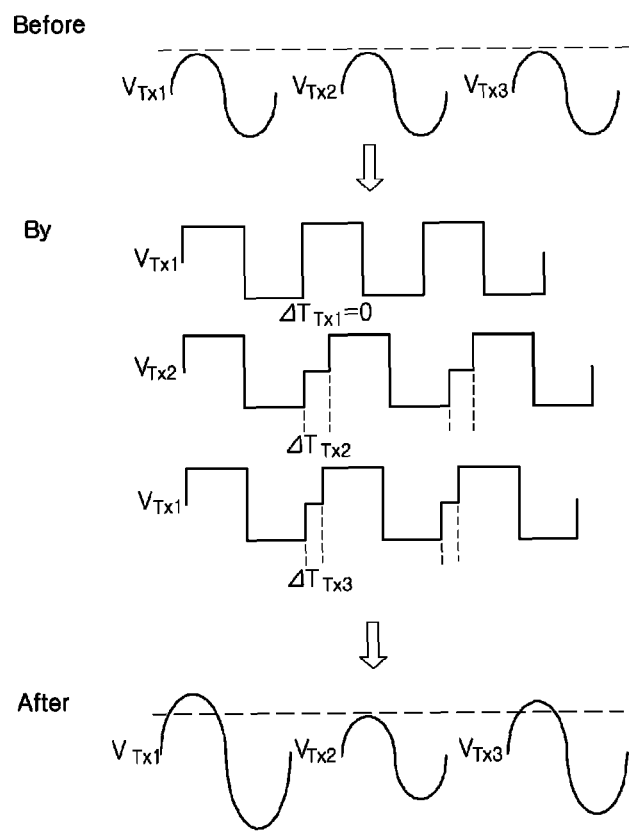
Figure 6D:
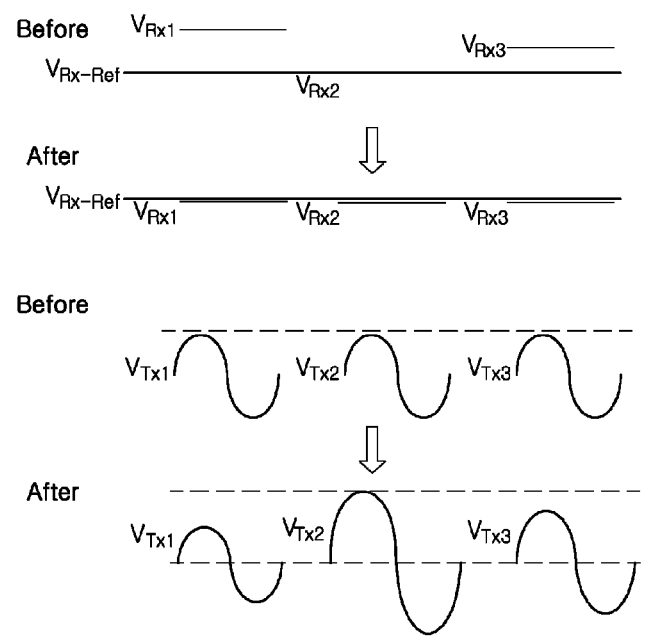

In order to control the amounts of power transmitted by the power transmitting coils, switching on duties or switching off duties of the corresponding switch circuits may be controlled, as illustrated in FIG. 6B, or switching dead times of the corresponding switch circuits may be controlled, as illustrated in FIG. 6C.

The above-mentioned charging operations will be described in detail with reference to FIGS. 7A through 7D.

Figure 7A:
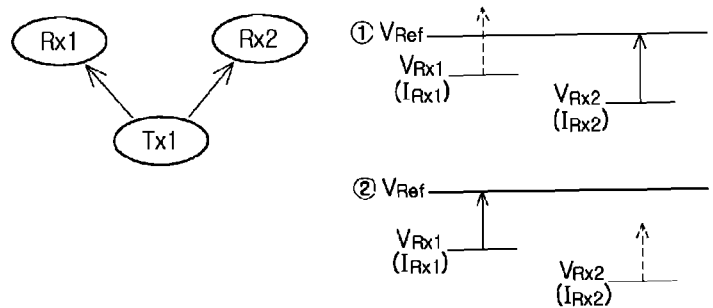

Referring to FIG. 7A, for example, the charger according to an exemplary embodiment in the present disclosure may include a single power transmitting unit Tx1 and the power transmitting unit Tx1 may wirelessly transmit power to at least two power receiving units Rx1 and Rx2.

Here, the power transmitting unit Tx1 may have the configuration illustrated in FIG. 3A or 3B, and each of the power receiving units Rx1 and Rx2 may have the configuration illustrated in FIGS. 4A through 4D.

For example, in a case in which a voltage $V_{Rx2}$ (or a current $I_{Rx2}$) detected by a second power receiving unit Rx2 is lower than a voltage $V_{Rx1}$ (or a current $I_{Rx1}$) detected by a first power receiving unit Rx1, that is, in a case of ① in FIG. 7A, a level of power wirelessly transmitted by the power transmitting unit Tx1 may be increased so that the voltage $V_{Rx2}$ detected by the second power receiving unit Rx2 reaches a reference voltage $V_{Ref}$. Therefore, the voltage $V_{Rx1}$ detected by the first power receiving unit Rx1 receiving the power wirelessly transmitted by the power transmitting unit Tx1 may exceed the reference voltage $V_{Ref}$; however, rapid power charging may be achieved. Here, the reference voltage $V_{Ref}$ may be set to allow a maximum current to flow in a corresponding battery cell.

In a case of ② in FIG. 7A, the level of the power wirelessly transmitted by the power transmitting unit Tx1 may be increased so that the voltage $V_{Rx1}$ detected by the first power receiving unit Rx1 reaches the reference voltage $V_{Ref}$. Therefore, the voltage $V_{Rx2}$ detected by the second power receiving unit Rx2 receiving the power wirelessly transmitted by the power transmitting unit Tx1 may not reach the reference voltage $V_{Ref}$; however, power transmission efficiency may be increased.

Figure 7B:
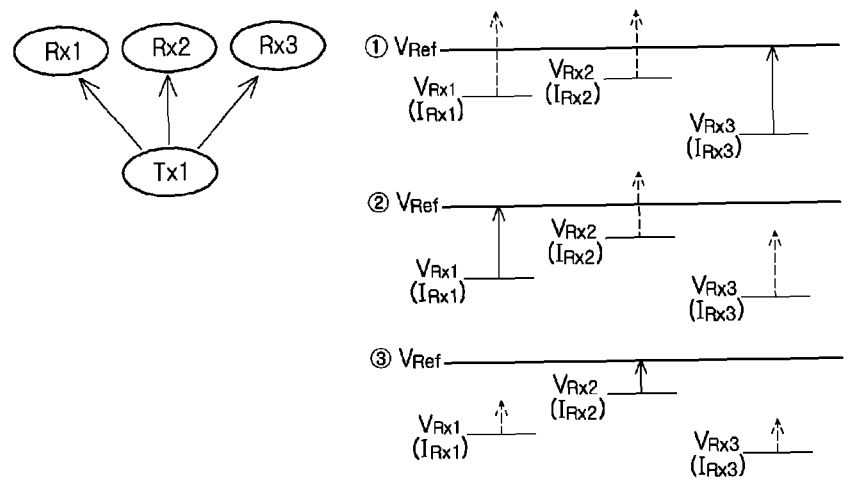

Referring to FIG. 7B, for example, the charger according to an exemplary embodiment in the present disclosure may include a single power transmitting unit Tx1, and the power transmitting unit Tx1 may wirelessly transmit power to at least three power receiving units Rx1, Rx2, and Rx3.

For example, in a case in which a voltage $V_{Rx2}$ (or a current $I_{Rx2}$) detected by a second power receiving unit Rx2 is higher than a voltage $V_{Rx1}$ (or a current $I_{Rx1}$) detected by a first power receiving unit Rx1 and a voltage $V_{Rx3}$ (or a current $I_{Rx3}$) detected by a third power receiving unit Rx3 is lower than the voltage $V_{Rx1}$ (or the current $I_{Rx1}$) detected by the first power receiving unit Rx1, that is, in a case of ① in FIG. 7B, a level of power wirelessly transmitted by the power transmitting unit Tx1 may be increased so that the voltage $V_{Rx3}$ detected by the third power receiving unit Rx3, having a minimum value, reaches a reference voltage $V_{Ref}$. Therefore, the voltage $V_{Rx1}$ detected by the first power receiving unit Rx1 receiving the power wirelessly transmitted by the power transmitting unit Tx1 and the voltage $V_{Rx2}$ detected by the second power receiving unit Rx2 receiving the power wirelessly transmitted by the power transmitting unit Tx1 may exceed the reference voltage $V_{Ref}$; however, rapid power charging may be achieved, while power transmission efficiency may be decreased.

In a case of ② in FIG. 7B, the level of the power wirelessly transmitted by the power transmitting unit Tx1 may be increased so that the voltage $V_{Rx1}$ detected by the first power receiving unit Rx1, having an intermediate value, reaches the reference voltage $V_{Ref}$. Therefore, the voltage $V_{Rx2}$ detected by the second power receiving unit Rx2 receiving the power wirelessly transmitted by the power transmitting unit Tx1 may exceed the reference voltage $V_{Ref}$, and the voltage $V_{Rx3}$ detected by the third power receiving unit Rx3 receiving the power wirelessly transmitted by the power transmitting unit Tx1 may not reach the reference voltage $V_{Ref}$.

In a case of ③ in FIG. 7B, the level of the power wirelessly transmitted by the power transmitting unit Tx1 may be increased so that the voltage $V_{Rx2}$ detected by the second power receiving unit Rx2, having a maximum value, reaches the reference voltage $V_{Ref}$. Therefore, the voltage $V_{Rx1}$ detected by the first power receiving unit Rx1 receiving the power wirelessly transmitted by the power transmitting unit Tx1 and the voltage $V_{Rx3}$ detected by the third power receiving unit Rx3 receiving the power wirelessly transmitted by the power transmitting unit Tx1 may not reach the reference voltage $V_{Ref}$; however, power transmission efficiency may be increased, while a power charging speed may be decreased.

Figure 7C:
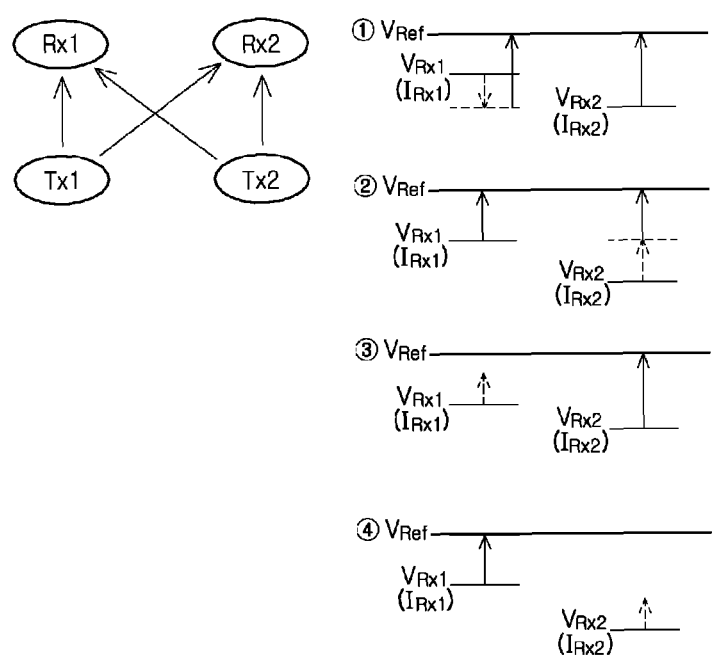

Referring to FIG. 7C, for example, the charger according to an exemplary embodiment in the present disclosure may include at least two power transmitting units Tx1 and Tx2, and the power transmitting units Tx1 and Tx2 may wirelessly transmit power to at least two power receiving units Rx1 and Rx2.

For example, in a case in which a voltage $V_{Rx2}$ (or a current $I_{Rx2}$) detected by a second power receiving unit Rx2 is lower than a voltage $V_{Rx1}$ (or a current $I_{Rx1}$) detected by a first power receiving unit Rx1, that is, in a case of ① in FIG. 7C, levels of power wirelessly transmitted by first and second power transmitting units Tx1 and Tx2 may be controlled so that the voltage $V_{Rx1}$ detected by the first power receiving unit Rx1 becomes the same as the voltage $V_{Rx2}$ detected by the second power receiving unit Rx2. Then, the levels of the power wirelessly transmitted by the first and second power transmitting units Tx1 and Tx2 may be controlled so that the voltage $V_{Rx1}$ detected by the first power receiving unit Rx1 and the voltage $V_{Rx2}$ detected by the second power receiving unit Rx2 are changed to be equal to the reference voltage $V_{Ref}$.

In a case of ② in FIG. 7C, the levels of the power wirelessly transmitted by the first and second power transmitting units Tx1 and Tx2 may be controlled so that the voltage $V_{Rx2}$ detected by the second power receiving unit Rx2 becomes the same as the voltage $V_{Rx1}$ detected by the first power receiving unit Rx1. Then, the levels of the power wirelessly transmitted by the first and second power transmitting units Tx1 and Tx2 may be controlled so that the voltage $V_{Rx1}$ detected by the first power receiving unit Rx1 and the voltage $V_{Rx2}$ detected by the second power receiving unit Rx2 are changed to be equal to the reference voltage $V_{Ref}$.

On the other hand, in a case of ③ or ④ in FIG. 7C, the levels of the power wirelessly transmitted by the first and second power transmitting units Tx1 and Tx2 may be increased so that the voltage $V_{Rx2}$ detected by the second power receiving unit Rx2 reaches the reference voltage $V_{Ref}$, or may be increased so that the voltage $V_{Rx1}$ detected by the first power receiving unit Rx1 reaches the reference voltage $V_{Ref}$. Such an increase in levels of power may be controlled depending on a degree of coupling between the power transmitting unit and the power receiving unit, thereby maintaining a balance between the battery cells and/or rapidly charging the battery cells with the maximum allowable current.

Figure 7D:
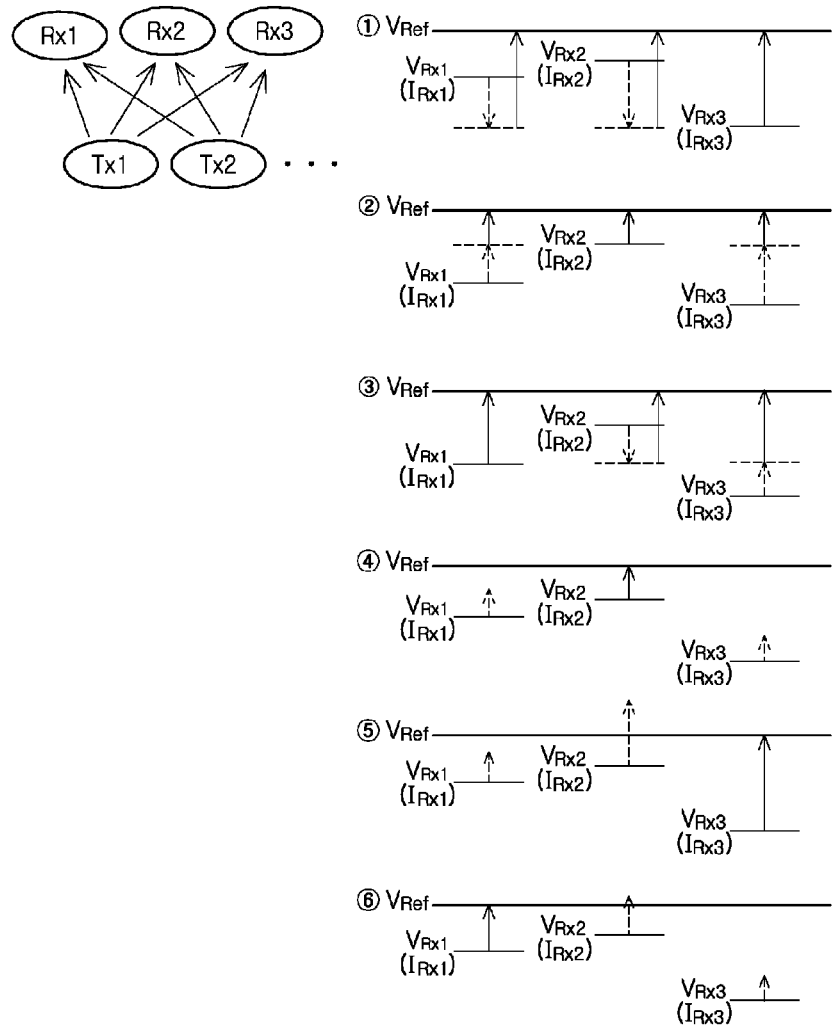

Referring to FIG. 7D, for example, the charger according to an exemplary embodiment in the present disclosure may include at least two power transmitting units Tx1 and Tx2, and the power transmitting units Tx1 and Tx2 may wirelessly transmit power to at least three power receiving units Rx1, Rx2, and Rx3.

In a case in which a voltage $V_{Rx2}$ (or a current $I_{Rx2}$) detected by a second power receiving unit Rx2 is higher than a voltage $V_{Rx1}$ (or a current $I_{Rx1}$) detected by a first power receiving unit Rx1 and a voltage $V_{Rx3}$ (or a current $I_{Rx3}$) detected by a third power receiving unit Rx3 is lower than the voltage $V_{Rx1}$ (or the current $I_{Rx1}$) detected by the first power receiving unit Rx1, that is, in a case of ① in FIG. 7D, levels of power wirelessly transmitted by first and second power transmitting units Tx1 and Tx2 may be controlled so that the voltage $V_{Rx1}$ detected by the first power receiving unit Rx1 and the voltage $V_{Rx2}$ detected by the second power receiving unit Rx2 become the same as the voltage $V_{Rx3}$ detected by the third power receiving unit Rx3, having a minimum value. Then, the levels of the power wirelessly transmitted by the first and second power transmitting units Tx1 and Tx2 may be controlled so that the voltage $V_{Rx1}$ detected by the first power receiving unit Rx1, the voltage $V_{Rx2}$ detected by the second power receiving unit Rx2, and the voltage $V_{Rx3}$ detected by the third power receiving unit Rx3 are changed to be equal to a reference voltage $V_{Ref}$.

In a case of ② in FIG. 7D, the levels of the power wirelessly transmitted by the first and second power transmitting units Tx1 and Tx2 may be controlled so that the voltage $V_{Rx1}$ detected by the first power receiving unit Rx1 and the voltage $V_{Rx3}$ detected by the third power receiving unit Rx3 become the same as the voltage $V_{Rx2}$ detected by the second power receiving unit Rx2, having a maximum value. Then, the levels of the power wirelessly transmitted by the first and second power transmitting units Tx1 and Tx2 may be controlled so that the voltage $V_{Rx1}$ detected by the first power receiving unit Rx1, the voltage $V_{Rx2}$ detected by the second power receiving unit Rx2, and the voltage $V_{Rx3}$ detected by the third power receiving unit Rx3 are changed to be equal to the reference voltage $V_{Ref}$.

In a case of ③ in FIG. 7D, the levels of the power wirelessly transmitted by the first and second power transmitting units Tx1 and Tx2 may be controlled so that the voltage $V_{Rx2}$ detected by the second power receiving unit Rx2 and the voltage $V_{Rx3}$ detected by the third power receiving unit Rx3 become the same as the voltage $V_{Rx1}$ detected by the first power receiving unit Rx1, having an intermediate value. Then, the levels of the power wirelessly transmitted by the first and second power transmitting units Tx1 and Tx2 may be controlled so that the voltage $V_{Rx1}$ detected by the first power receiving unit Rx1, the voltage $V_{Rx2}$ detected by the second power receiving unit Rx2, and the voltage $V_{Rx3}$ detected by the third power receiving unit Rx3 are changed to be equal to the reference voltage $V_{Ref}$.

In addition, in a case of ④, ⑤ or ⑥ in FIG. 7D, the levels of the power wirelessly transmitted by the first and second power transmitting units Tx1 and Tx2 may be increased so that the voltage $V_{Rx2}$ detected by the second power receiving unit Rx2 reaches the reference voltage $V_{Ref}$, or the levels of the power wirelessly transmitted by the first and second power transmitting units Tx1 and Tx2 may be increased so that the voltage $V_{Rx3}$ detected by the third power receiving unit Rx3 reaches the reference voltage $V_{Ref}$, or the levels of the power wirelessly transmitted by the first and second power transmitting units Tx1 and Tx2 may be increased so that the voltage $V_{Rx1}$ detected by the first power receiving unit Rx1 reaches the reference voltage $V_{Ref}$. The first and second power transmitting units Tx1 and Tx2 may increase the levels of the power wirelessly transmitted by the first and second power transmitting units Tx1 and Tx2 so that the voltages detected by the power receiving units coupled to the first and second power transmitting units Tx1 and Tx2 reach the reference voltage $V_{Ref}$. However, in this case, the power may also be wirelessly transmitted to power receiving units disposed in the vicinity of the first and second power transmitting units Tx1 and Tx2.

Meanwhile, referring to FIGS. 8A and 8B, in a case in which the charger according to an exemplary embodiment in the present disclosure includes at least two power transmitting units Tx1 and Tx2 as illustrated in FIGS. 7C and 7D, a wireless coupling relationship may be set between the power transmitting units Tx1 and Tx2 and two or more power receiving units Rx1, Rx2, and Rx3. For example, a power receiving unit receiving the highest amount of power from a corresponding power transmitting unit transmitting power wirelessly has the highest wireless power coupling relationship.

To this end, a power coupling relationship between corresponding power transmitting units and power receiving units may be set depending on power state information including information on voltages or currents detected by the power receiving units Rx1, Rx2, and Rx3. For example, two power transmitting units Tx1 and Tx2 may be sequentially turned on/off to search for the power receiving unit receiving the highest amount of power from the corresponding power transmitting units, as illustrated in FIG. 8A, or amounts of power wirelessly transmitted by the power transmitting units Tx1 and Tx2 may be alternately varied to search for the power receiving unit having the highest amount of change in levels of the power received from the corresponding power transmitting units, as illustrated in FIG. 8B.

Figure 9A:
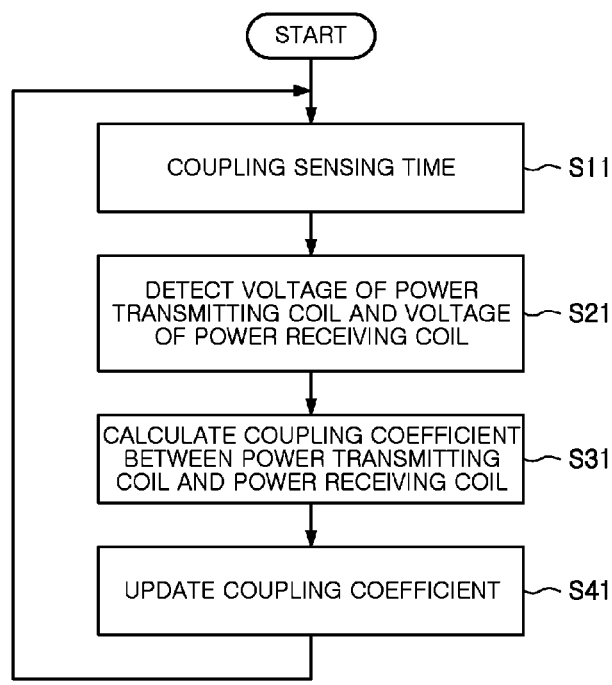
FIGS. 9A and 9B are flow charts illustrating examples of a method of sensing a coupling coefficient according to exemplary embodiments in the present disclosure.
Figure 9B:
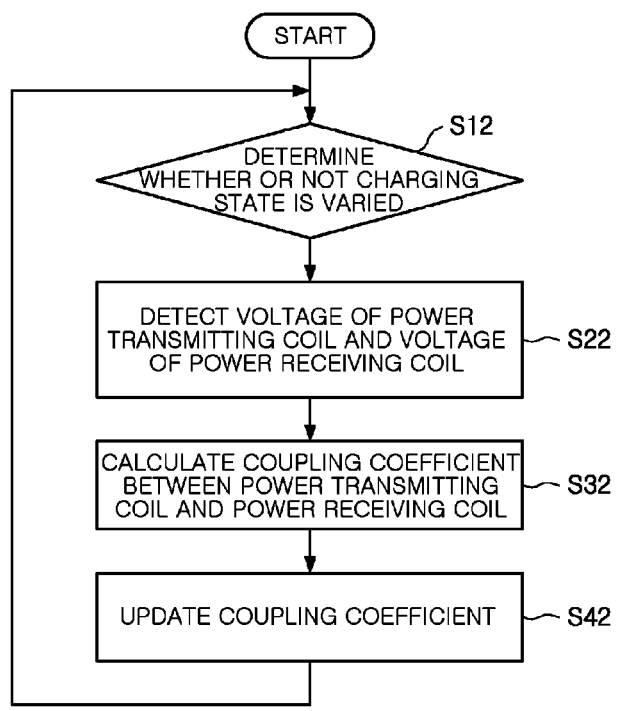

FIGS. 9A and 9B are flowcharts illustrating examples of a method of sensing a coupling coefficient according to exemplary embodiments in the present disclosure.

First, referring to FIG. 9A, in a sensing time in which a coupling coefficient is sensed according to a preset period (S11), a voltage or current level of power transmitted by a power transmitting coil of a power transmitting unit and a voltage or current level of power applied to a power receiving coil or a battery cell of a power receiving unit may be detected (S21), and a coupling coefficient between a power transmitting side and a power receiving side may be calculated (S31).

The calculated coupling coefficient may be transferred to a control circuit controlling power transmitted by the power transmitting unit (S41).

Referring to FIG. 9B, in a case in which a charging state is varied (S12), a voltage or current level of power transmitted by a power transmitting coil of a power transmitting unit and a voltage or current level of power applied to a power receiving coil or a battery cell of a power receiving unit may be detected (S22), and a coupling coefficient between a power transmitting side and a power receiving side may be calculated (S32). The calculated coupling coefficient may be transferred to a control circuit controlling power transmitted by the power transmitting unit (S42).

Here, the charging state may be varied by new power charging conditions, such as changes in the position of the charger or the battery or the introduction of an additional battery in addition to the battery charged with power from the charger. An example of a method of detecting the above-mentioned power charging conditions may include detecting a case in which the voltage or current level of power applied to the power receiving coil or the battery cell of the power receiving unit is changed to be equal to a reference level or higher.

The coupling coefficient between the charger and the battery described above may be calculated by sequentially turning on/off the power transmitting units Tx1 and Tx2 to search for the power receiving unit receiving the highest amount of power from the corresponding power transmitting units, as illustrated in FIG. 8A, or alternately varying the amounts of power wirelessly transmitted by the power transmitting units Tx1 and Tx2 to search for the power receiving unit having the highest amount of change in levels of power received from the corresponding power transmitting units, as illustrated in FIG. 8B.

First, a relationship between the voltage levels of the power applied to the power receiving coils or the battery cells of the power receiving units of the battery and the voltage levels of the power transmitted by the power transmitting coils of the power transmitting units of the charger may be represented by the following Equation 1:

$$\begin{bmatrix} V_{R\times 1} \\ V_{R\times 2} \end{bmatrix} = \begin{bmatrix} C_{11} & C_{12} \\ C_{21} & C_{22} \end{bmatrix} \begin{bmatrix} V_{T\times 1} \\ V_{T\times 2} \end{bmatrix} \qquad \text{Equation 1}$$

Here, $V_{Rx1}$ and $V_{Rx2}$ indicate voltage levels of power applied to power receiving coils or battery cells of power receiving units Rx1 and Rx2, respectively, $V_{Tx1}$ and $V_{Tx2}$ indicate voltage levels of power applied to power transmitting coils of power transmitting units Tx1 and Tx2, respectively, and $C_{11}$, $C_{12}$, $C_{21}$, and $C_{22}$ indicate coupling coefficients between the charger and the battery, that is, between the power receiving units Rx1 and Rx2 and the power transmitting units Tx1 and Tx2.

Here, two power transmitting coils and two power receiving coils are used by way of example, but the number of coils is not limited thereto. Meanwhile, even in a case in which the number of power transmitting coils and power receiving coils is three or more, the relationship between the voltage levels of the power applied to the power receiving coils or the battery cells of the power receiving units of the battery and the voltage levels of the power transmitted by the power transmitting coils of the power transmitting units of the charger may be represented in the same manner. In addition, $C_{ij}$ indicates a coupling coefficient between $V_{Rxi}$ and $V_{Txj}$.

In a case in which the coupling coefficients are calculated by sequentially turning on/off the power transmitting units Tx1 and Tx2 to search for the power receiving unit receiving the highest amount of power from the corresponding power transmitting units, as illustrated in FIG. 8A, for example, when the power applied to the power transmitting unit Tx2 is turned off, the following Equation 2 may be obtained:

$$\begin{bmatrix} V_{R\times 1} \\ V_{R\times 2} \end{bmatrix} = \begin{bmatrix} C_{11} & C_{12} \\ C_{21} & C_{22} \end{bmatrix} \begin{bmatrix} V_{T\times 1} \\ 0 \end{bmatrix} = \begin{bmatrix} C_{11} \cdot V_{T\times 1} \\ C_{21} \cdot V_{T\times 1} \end{bmatrix} \quad \text{Equation 2}$$

Referring to Equation 2, coupling coefficients $C_{11}$ and $C_{21}$ may be calculated by the following Equation 3:

$$\begin{bmatrix} C_{11} \\ C_{21} \end{bmatrix} = \begin{bmatrix} \frac{V_{R\times 1}}{V_{T\times 1}} \\ \frac{V_{R\times 2}}{V_{T\times 1}} \end{bmatrix} \quad \text{Equation 3}$$

Next, when the power applied to the power transmitting unit Tx1 is turned off, the coupling coefficients $C_{12}$ and $C_{22}$ may be calculated by the following Equation 4:

$$\begin{bmatrix} C_{12} \\ C_{22} \end{bmatrix} = \begin{bmatrix} \frac{V_{R\times 1}}{V_{T\times 2}} \\ \frac{V_{R\times 2}}{V_{T\times 2}} \end{bmatrix} \quad \text{Equation 4}$$

Meanwhile, in a case in which the coupling coefficients are calculated by alternately varying the amount of power wirelessly transmitted by the power transmitting units Tx1 and Tx2 to search for the power receiving unit having the highest amount of change in levels of power received from the corresponding power transmitting units, as illustrated in FIG. 8B, a relationship between changes in the voltage levels of the power applied to the power receiving coils or the battery cells of the power receiving units of the battery and changes in the voltage levels of the power transmitted by the power transmitting coils of the power transmitting units of the charger may be represented by the following Equation 5:

$$\begin{bmatrix} \Delta V_{R\times 1} \\ \Delta V_{R\times 2} \end{bmatrix} = \begin{bmatrix} C_{11} & C_{12} \\ C_{21} & C_{22} \end{bmatrix} \begin{bmatrix} \Delta V_{T\times 1} \\ \Delta V_{T\times 2} \end{bmatrix} \quad \text{Equation 5}$$

Here, $\Delta V_{Rx1}$ and $\Delta V_{Rx2}$ indicate changes in voltage levels of power applied to power receiving coils or battery cells of power receiving units Rx1 and Rx2, respectively, $\Delta V_{Tx1}$ and $\Delta V_{Tx2}$ indicate changes in voltage levels of power applied to power transmitting coils of power transmitting units Tx1 and Tx2, respectively, and $C_{11}$, $C_{12}$, $C_{21}$, and $C_{22}$ indicate coupling coefficients between the charger and the battery, that is, between the power receiving units Rx1 and Rx2 and the power transmitting units Tx1 and Tx2.

First, when an output voltage of the power transmitting unit Tx2 is fixed ($\Delta V_{Tx2}=0$) and an output voltage of the power transmitting unit Tx1 is varied by a predetermined level, voltage levels of power transmitted to the power receiving units Rx1 and Rx2 may be varied depending on a degree of coupling between the power receiving units Rx1 and Rx2 and the power transmitting unit Tx1, and this relationship may be represented by the following Equation 6:

$$\begin{bmatrix} \Delta V_{R\times 1} \\ \Delta V_{R\times 2} \end{bmatrix} = \begin{bmatrix} C_{11} & C_{12} \\ C_{21} & C_{22} \end{bmatrix} \begin{bmatrix} V_{T\times 1} \\ 0 \end{bmatrix} = \begin{bmatrix} C_{11} \cdot \Delta V_{T\times 1} \\ C_{21} \cdot \Delta V_{T\times 1} \end{bmatrix} \quad \text{Equation 6}$$

Referring to Equation 6, coupling coefficients $C_{11}$ and $C_{21}$ may be calculated by the following Equation 7:

$$\begin{bmatrix} C_{11} \\ C_{21} \end{bmatrix} = \begin{bmatrix} \frac{\Delta V_{R\times 1}}{\Delta V_{T\times 1}} \\ \frac{\Delta V_{R\times 2}}{\Delta V_{T\times 1}} \end{bmatrix} \quad \text{Equation 7}$$

Next, when an output voltage of the power transmitting unit Tx1 is fixed ($\Delta V_{Tx1}=0$) and an output voltage of the power transmitting unit Tx2 is varied by a predetermined level, coupling coefficients $C_{12}$ and $C_{22}$ may be calculated by the following Equation 8:

$$\begin{bmatrix} C_{12} \\ C_{22} \end{bmatrix} = \begin{bmatrix} \frac{\Delta V_{R\times 1}}{\Delta V_{T\times 2}} \\ \frac{\Delta V_{R\times 2}}{\Delta V_{T\times 2}} \end{bmatrix} \quad \text{Equation 8}$$

Although the coupling coefficients are calculated on the basis of the voltage levels of the power applied to the power receiving coils or the battery cells and the voltage levels of the power applied to the power transmitting coils by way of example, they may be calculated by using current levels of the power applied to the power receiving coils or the battery cells and current levels of the power applied to the power transmitting coils.

Figure 10A:
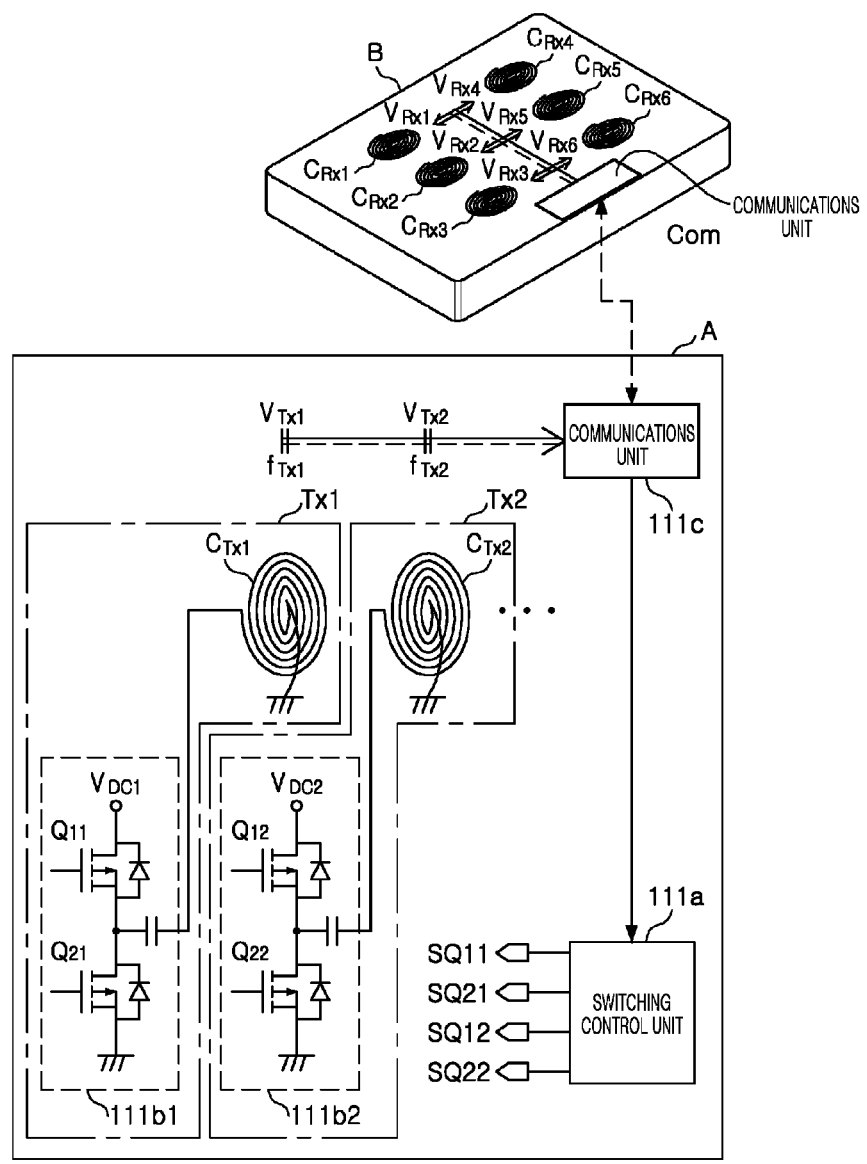
FIGS. 10A and 10B are circuit diagrams schematically illustrating examples of data communications between a charger and a battery according to exemplary embodiments in the present disclosure.
Figure 10B:
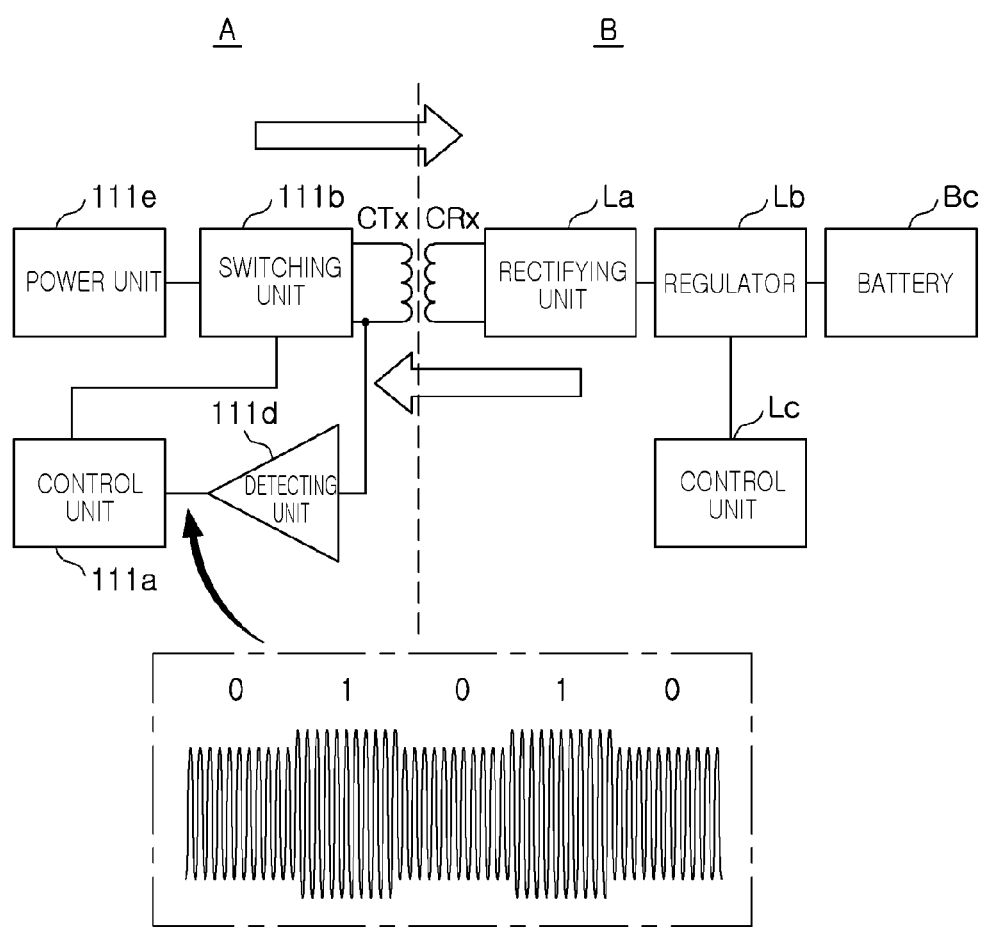

FIGS. 10A and 10B are circuit diagrams schematically illustrating data communications between a charger and a battery according to exemplary embodiments in the present disclosure.

Referring to FIG. 10A, the power transmitting units Tx1 and Tx2 of the charger A may include power transmitting coils $C_{Tx1}$ and $C_{Tx2}$ and switching units 111b1 and 111b2. The switching units 111b1 and 111b2 may transfer power to the power transmitting coils $C_{Tx1}$ and $C_{Tx2}$, respectively, in order to calculate the coupling coefficients between the power transmitting side and the power receiving side as described above.

The switches Q11, Q21, Q12, and Q22 of the switching units 111b1 and 111b2 may switch driving power $V_{DC1}$ and $V_{DC2}$ depending on switching control signals SQ11, SQ21, SQ12, and SQ22 from the switching control unit 111a to transfer the power externally through the corresponding power transmitting coils $C_{Tx1}$ and $C_{Tx2}$ in a non-contact manner.

The switching control unit 111a may control power switching of the switching units 111b1 and 111b2 depending on information of the battery B transferred by the communications unit 111c. For example, the switching control unit 111a may control respective switching duties or on-off dead times of the switches Q11, Q21, Q12, and Q22 to adjust voltage levels $V_{Tx1}$ and $V_{Tx2}$ of the power output through the power transmitting coils $C_{Tx1}$ and $C_{Tx2}$, or may control voltage levels of the driving power $V_{DC1}$ and $V_{DC2}$ to adjust the voltage levels $V_{Tx1}$ and $V_{Tx2}$ of the power output through the power transmitting coils $C_{Tx1}$ and $C_{Tx2}$, or may control switching frequencies to adjust frequencies $f_{Tx1}$ and $f_{Tx2}$ at which the power is transmitted by the power transmitting coils $C_{Tx1}$ and $C_{Tx2}$.

The above-mentioned adjusting or controlling operations may be performed on the basis of the coupling coefficients between the power transmitting side and the power receiving side, and since information on a position, a charging state, an operating state, charging power, and the like, of the battery B is continuously needed for power charging of the charger A, the information may be transferred by bidirectional communications between the communications unit 111c of the charger A and the communications unit Com of the battery B. In addition, information on positions, power transmitting states, power switching operations, charging power, and the like, of the power transmitting coils $C_{Tx1}$ and $C_{Tx2}$ of the charger A may be transferred to the battery B through the communications unit Com of the battery B. In addition, the voltage or current levels of the power received by the power receiving coils $C_{Rx1}$, $C_{Rx2}$, $C_{Rx3}$, $C_{Rx4}$, $C_{Rx5}$, and $C_{Rx6}$ or of the power applied to the battery cells may be transferred to the charger A through the communications unit 111c, and the voltage or current levels of the power applied to the power transmitting coils $C_{Tx1}$ and $C_{Tx2}$ may be transferred to the battery B through the communications unit. In a case in which the coupling coefficients between the power transmitting coils $C_{Tx1}$ and $C_{Tx2}$ of the charger A and the power receiving coils $C_{Rx1}$, $C_{Rx2}$, $C_{Rx3}$, $C_{Rx4}$, $C_{Rx5}$, and $C_{Rx6}$ of the battery B are calculated in the battery B, the calculated coupling coefficients may be transferred to the charger A through the communications unit.

The above-mentioned bidirectional communications may be performed by using various communications schemes such as Bluetooth, Zigbee®, Wi-Fi, and near field communications (NFC), and various communications frequencies.

Referring to FIG. 10B, the power may be transmitted and the information may be transferred between the power transmitting coil CTx of the charger A and the power receiving coil CRx of the battery B in the non-contact manner.

The power supply unit 110 of the charger A may include a power unit 111e, a switching unit 111b, a detecting unit 111d and a control unit 111a. The power unit 111e may convert alternating current (AC) power into direct current (DC) power. The switching unit 111b may switch the DC power from the power unit 111e depending on a control of the control unit 111a to transmit the DC power externally through the power transmitting coil CTx. The detecting unit 111d may detect a power state of the power transmitting coil CTx. The control unit 111a may control the switching of the switching unit 111b depending on information detected by the detecting unit 111d.

The battery B may include a rectifying unit La, a regulator Lb, and a control unit Lc. The rectifying unit La may rectify power from the power receiving coil CRx. The regulator Lb may regulate the rectified power to charging power which is appropriate for charging a battery Bc. The control unit Lc may control an operation of the regulator Lb.

The power transmitted to the power receiving coil CRx may be varied according to the operation of the regulator Lb, a power level change of the power receiving coil CRx may affect the power transmitting coil CTx by magnetic coupling between the power receiving coil CRx and the power transmitting coil CTx, the detecting unit 111d may detect the power level change of the power receiving coil CRx and transfer the detected information to the control unit 111a, and the control unit 111a may control the switching operation of the switching unit 111b depending on the detected information.

Communications may be performed between the battery B and the charger A, depending on the above-mentioned power level change, without being limited thereto. In addition, information on the voltage or current levels of the power received by the power receiving coils of the battery B, information on the voltage or current levels of the power applied to the battery cells of the battery B, the information on the position, the charging state, the operating state, and the charging power of the battery B, information on the voltage or current levels of the power applied to the power transmitting coils of the charger A, and information on the positions, the power transmitting states, the power switching operations, the charging power, and the like, of the power transmitting coils of the charger A may be transmitted and received using the communications in this scheme.

Here, in a case in which a plurality of power transmitting coils and power receiving coils are used, the information may be transmitted and received in a time division scheme.

The coupling coefficients between the power transmitting coils of the charger A and the power receiving coils of the battery B may be calculated on the basis of the transmitted and received information. In other words, the charger A may calculate the coupling coefficients on the basis of the transmitted and received information, or the battery B may calculate the coupling coefficients on the basis of the transmitted and received information and then transmit the calculated coupling coefficients to the charger A by the communications between the battery B and the charger A depending on the above-mentioned power level change.

The switching operation of the switching unit 111b of the charger A may be controlled on the basis of the coupling coefficients between the power transmitting coils of the charger A and the power receiving coils of the battery B.

Figure 11:
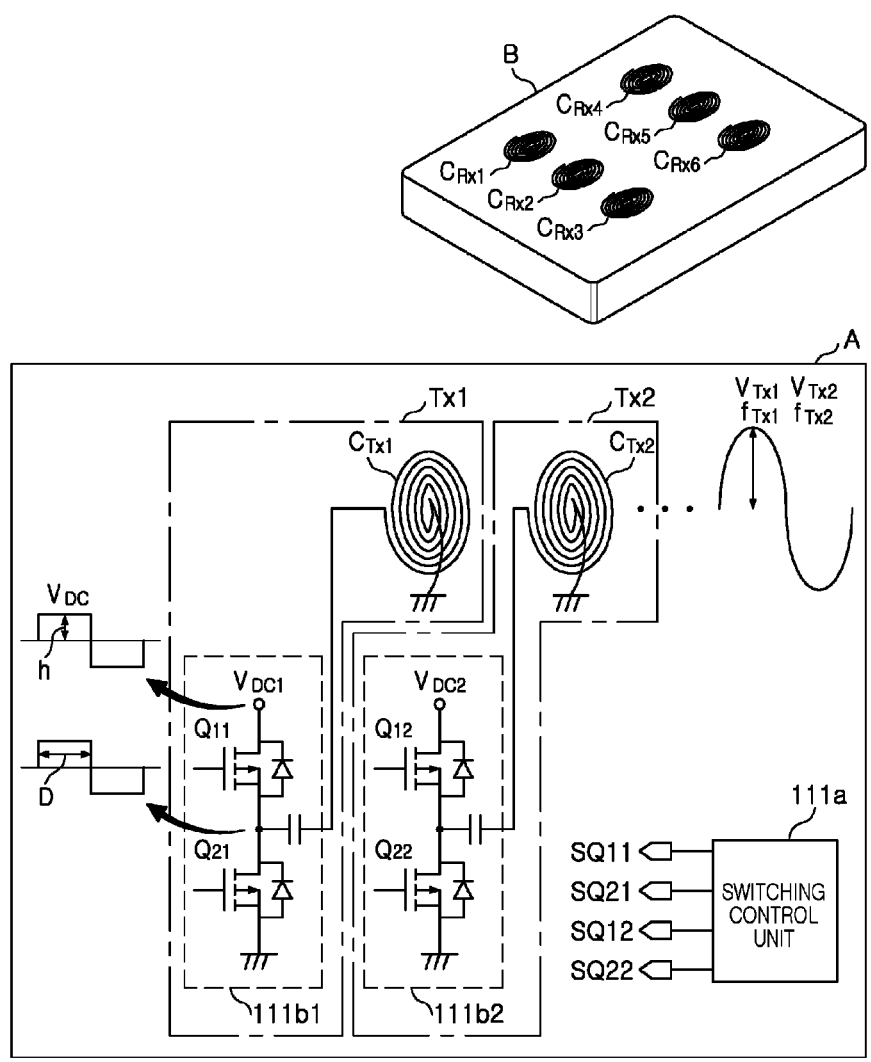
FIG. 11 is a circuit diagram schematically illustrating an example of controlling power transmitted from a charger to a battery according to an exemplary embodiment in the present disclosure.

FIG. 11 is a circuit diagram schematically illustrating an example of controlling power transmitted from a charger to a battery according to an exemplary embodiment in the present disclosure.

Referring to FIG. 11, the power transmitting units Tx1 and Tx2 of the charger A may include power transmitting coils $C_{Tx1}$ and $C_{Tx2}$ and switching units 111b1 and 111b2. The switching units 111b1 and 111b2 may transfer power to the power transmitting coils $C_{Tx1}$ and $C_{Tx2}$, respectively, in order to calculate the coupling coefficients between the power transmitting side and the power receiving side as described above.

The switches Q11, Q21, Q12, and Q22 of the switching units 111b1 and 111b2 may switch driving power $V_{DC1}$ and $V_{DC2}$ depending on switching control signals SQ11, SQ21, SQ12, and SQ22 from the switching control unit 111a to transfer the power externally through the corresponding power transmitting coils $C_{Tx1}$ and $C_{Tx2}$ in a non-contact manner.

The switching control unit 111a may control power switching of the switching units 111b1 and 111b2 depending on information of the battery B transferred from the communications unit 111c. For example, the switching control unit 111a may control respective switching duties or on-off dead times of the switches Q11, Q21, Q12, and Q22 to adjust the voltage levels $V_{Tx1}$ and $V_{Tx2}$ of the power output through the power transmitting coils $C_{Tx1}$ and $C_{Tx2}$, or may control voltage levels of the driving power $V_{DC1}$ and $V_{DC2}$ to adjust the voltage levels $V_{Tx1}$ and $V_{Tx2}$ of the power output through the power transmitting coils $C_{Tx1}$ and $C_{Tx2}$, or may control switching frequencies to adjust frequencies $f_{Tx1}$ and $f_{Tx2}$ at which the power is transmitted by the power transmitting coils $C_{Tx1}$ and $C_{Tx2}$.

The above-mentioned adjusting or controlling operation may be performed on the basis of the coupling coefficients between the power transmitting side and the power receiving side.

As an example, in a case in which a coupling coefficient between the first power transmitting coil $C_{Tx1}$ and the first power receiving coil $C_{Rx1}$ is low, the first power transmitting unit Tx1 may control respective switching frequencies of the switches Q11 and Q21 of the switching unit 111b1 to control the frequency $f_{Tx1}$ at which the power is transmitted by the power transmitting coil $C_{Tx1}$, in order to effectively control the power transferred to the first power receiving coil $C_{Rx1}$.

As another example, in a case in which a coupling coefficient between the second power transmitting coil $C_{Tx2}$ and the second power receiving coil $C_{Rx2}$ is high, the second power transmitting unit Tx2 may control respective switching duties or on-off dead times of the switches Q12 and Q22 of the switching unit 111b2 to adjust the voltage level $V_{Tx2}$ of the power output through the power transmitting coil $C_{Tx2}$ or may control the voltage level of the driving power $V_{DC2}$ to adjust the voltage level $V_{Tx2}$ of the power output through the power transmitting coil $C_{Tx2}$, thereby controlling the power transferred to the second power receiving coil $C_{Rx2}$.

Since the information on the position, the charging state, the operating state, the charging power, and the like, of the battery B is continuously needed for the power charging of the charger A, the information may be transferred through the bidirectional communications between the communications unit 111c of the charger A and the communications unit Com of the battery B. In addition, the information on the positions, the power transmitting states, the power switching operations, the charging power, and the like, of the power transmitting coils $C_{Tx1}$ and $C_{Tx2}$ of the charger A may be transferred to the battery B through the communications unit Com of the battery B.

Figure 12:
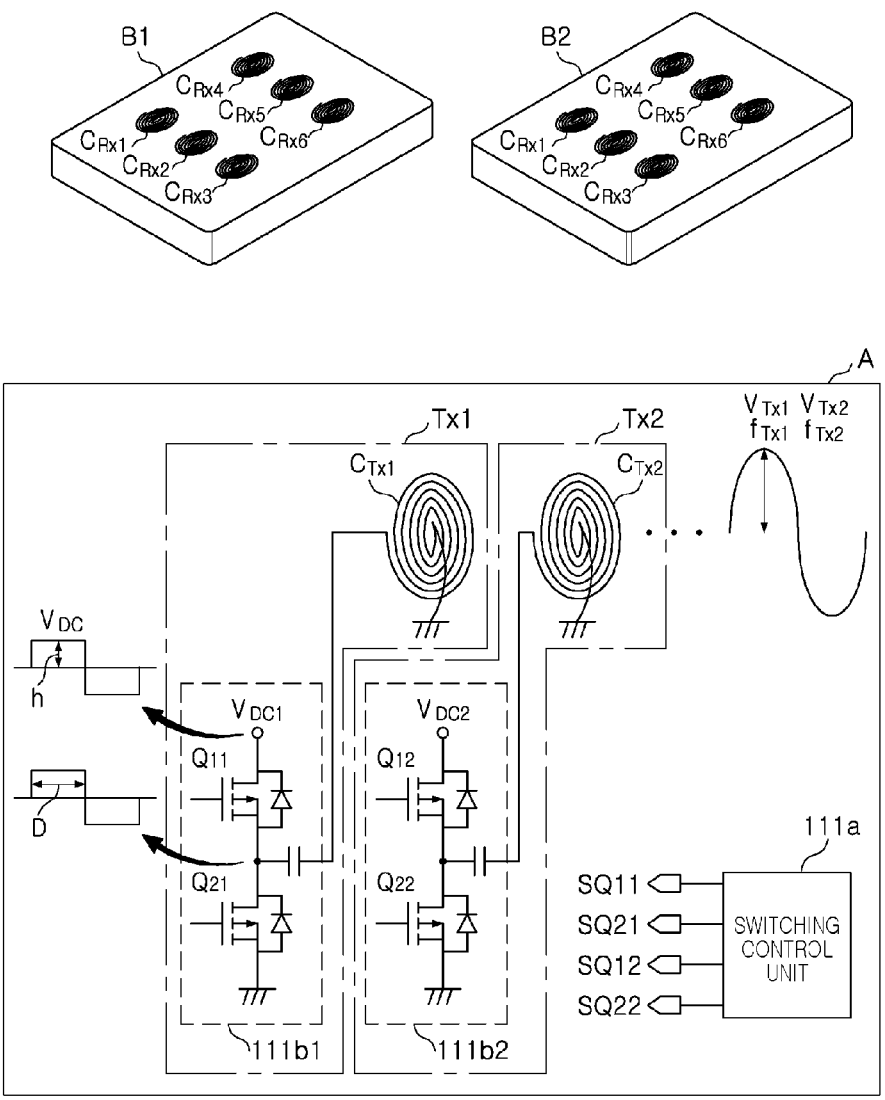
FIG. 12 is a circuit diagram schematically illustrating an example of controlling power transmitted from a charger to a plurality of batteries according to an exemplary embodiment in the present disclosure.

FIG. 12 is a circuit diagram schematically illustrating an example of controlling power transmitted from a charger to a plurality of batteries according to an exemplary embodiment in the present disclosure.

Referring to FIG. 12, the charger A according to an exemplary embodiment in the present disclosure may transmit power to a plurality of batteries B1 and B2 in a non-contact manner.

Each of the batteries B1 and B2 may include at least one power receiving coil. For example, each battery may include six power receiving coils $C_{Rx1}$, $C_{Rx2}$, $C_{Rx3}$, $C_{Rx4}$, $C_{Rx5}$, and $C_{Rx6}$.

Similar to the embodiment illustrated in FIG. 11, the power transmitting units Tx1 and Tx2 of the charger A may include power transmitting coils $C_{Tx1}$ and $C_{Tx2}$ and switching units 111b1 and 111b2. The switching units 111b1 and 111b2 may transfer power to the power transmitting coils $C_{Tx1}$ and $C_{Tx2}$, respectively, in order to calculate the coupling coefficients between the power transmitting side and the power receiving side.

The switches Q11, Q21, Q12, and Q22 of the switching units 111b1 and 111b2 may switch the driving power $V_{DC1}$ and $V_{DC2}$ depending on the switching control signals SQ11, SQ21, SQ12, and SQ22 from the switching control unit 111a to transfer the power externally through the corresponding power transmitting coils $C_{Tx1}$ and $C_{Tx2}$ in the non-contact manner.

The switching control unit 111a may control the power switching of the switching units 111b1 and 111b2 depending on the information transferred by the battery B. For example, the switching control unit 111a may control respective switching duties or on-off dead times of the switches Q11, Q21, Q12, and Q22 to adjust the voltage levels $V_{Tx1}$ and $V_{Tx2}$ of the power output through the power transmitting coils $C_{Tx1}$ and $C_{Tx2}$, or may control the voltage levels of the driving power $V_{DC1}$ and $V_{DC2}$ to adjust the voltage levels $V_{Tx1}$ and $V_{Tx2}$ of the power output through the power transmitting coils $C_{Tx1}$ and $C_{Tx2}$, or may control the switching frequencies to adjust the frequencies $f_{Tx1}$ and $f_{Tx2}$ at which the power are transmitted by the power transmitting coils $C_{Tx1}$ and $C_{Tx2}$.

The above-mentioned adjusting or controlling operation may be performed on the basis of the coupling coefficients between the power transmitting side and the power receiving side.

As an example, in a case in which a coupling coefficient between the first power transmitting coil $C_{Tx1}$ and a first power receiving coil $C_{Rx1}$ of a first battery B1 is low, the first power transmitting unit Tx1 may control respective switching frequencies of the switches Q11 and Q21 of the switching unit 111b1 to control a frequency $f_{Tx1}$ at which the power is transmitted by the power transmitting coil $C_{Tx1}$, in order to effectively control the power transferred to the first power receiving coil $C_{Rx1}$ of the first battery B1.

As another example, in a case in which a coupling coefficient between the second power transmitting coil $C_{Tx2}$ and a second power receiving coil $C_{Rx2}$ of a second battery B2 is high, the second power transmitting unit Tx2 may control respective switching duties or on-off dead times of the switches Q12 and Q22 of the switching unit 111b2 to adjust the voltage level $V_{Tx2}$ of the power output through the power transmitting coil $C_{Tx2}$ or may control the voltage level of the driving power $V_{DC2}$ to adjust the voltage level $V_{Tx2}$ of the power output through the power transmitting coil $C_{Tx2}$, thereby controlling the power transferred to the second power receiving coil $C_{Rx2}$ of the second battery B2.

In addition, each of the first and second power transmitting units Tx1 and Tx2 may be controlled to transmit the power to the first battery B1 at a first frequency, for example, a frequency of 100 to 300 kHz according to the wireless power consortium (WPC) standard and to transmit the power to the second battery B2 at a second frequency that is relatively high, for example, a frequency of 6.78 MHz according to the alliance for wireless power (A4WP) standard.

In addition, the power may be transmitted to the first power receiving coil $C_{Rx1}$ of the first battery B1 at the frequency of the WPC standard and may be transmitted to the second power receiving coil $C_{Rx2}$ of the first battery B1 at the frequency of the A4WP standard.

Since information on positions, charging states, operating states, power, and the like, of the batteries B1 and B2 is continuously needed for the power charging of the charger A, the information may be transferred through bidirectional communications between the charger A and the batteries B1 and B2. In addition, the information on the positions, the power transmitting states, the power switching operations, the charging power, and the like, of the power transmitting coils $C_{Tx1}$ and $C_{Tx2}$ of the charger A may be transferred to the batteries B1 and B2.

FIGS. 13A through 13D are views illustrating an example of a switching control of an active rectifier in a battery according to an exemplary embodiment in the present disclosure.

Figure 13A:
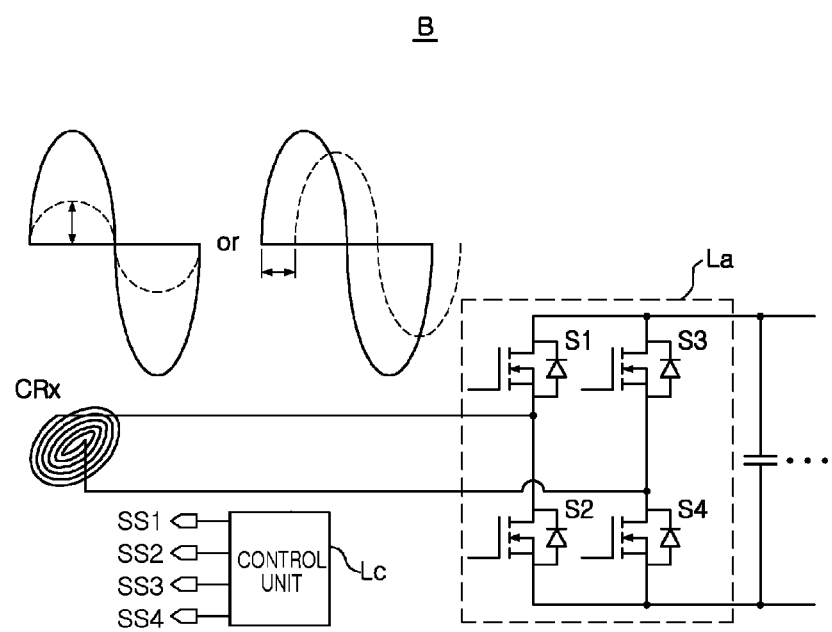
FIGS. 13A through 13D are views illustrating an example of a switching control of an active rectifier in a battery according to an exemplary embodiment in the present disclosure.

Referring to FIG. 13A, the battery B according to an exemplary embodiment in the present disclosure may receive power transmitted in a non-contact manner through the power receiving coil CRx. Here, a voltage and a current of the received power may have a phase difference, whereby power efficiency may deteriorate.

The battery B according to an exemplary embodiment may include an active rectifying unit La.

For example, the rectifying unit La may include four switches S1, S2, S3, and S4 connected to each other in a full bridge scheme.

A control unit Lc may provide gate signals SS1, SS2, SS3, and SS4 to control a switching operation of the rectifying unit La in a pulse width modulation (PWM) scheme.

Figure 13B:
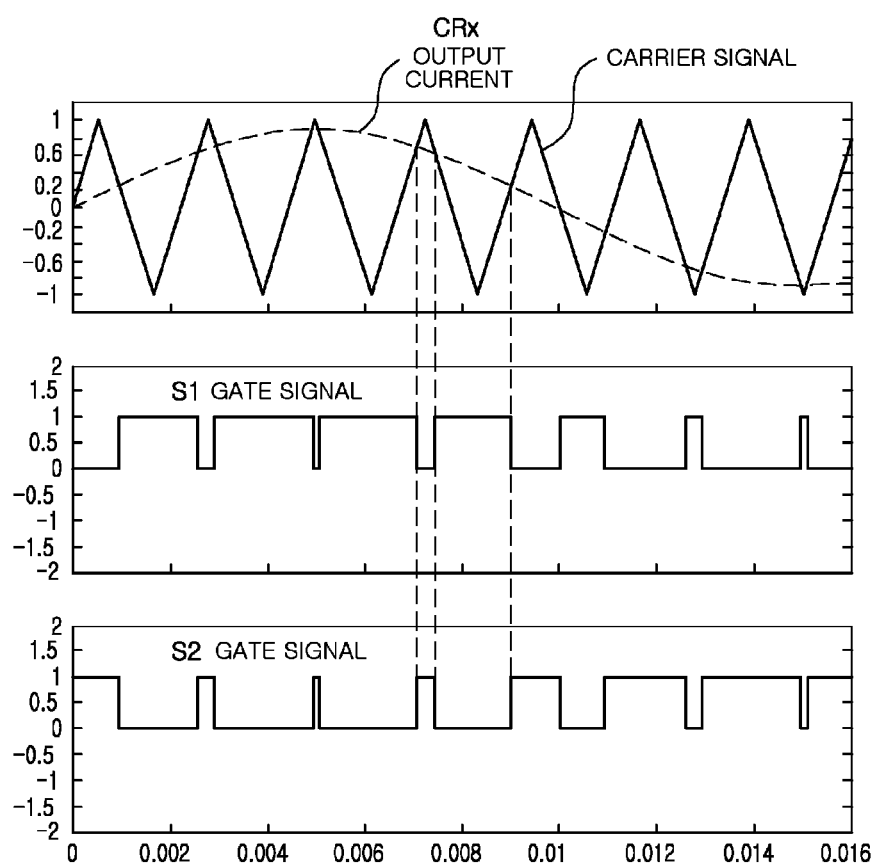
Figure 13C:
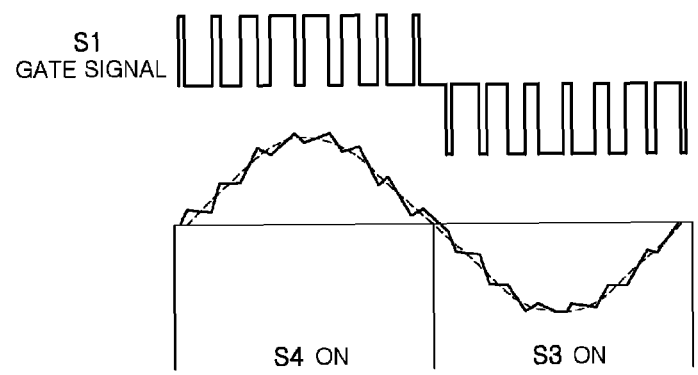

For example, as illustrated in FIG. 13B, the control unit Lc may compare a carrier signal having a frequency higher than a transmission frequency of the power transmitted in the non-contact manner with an output current of the power receiving coil CRx to provide gate signals of the first and second switches S1 and S2. In this case, each of the third and fourth switches S3 and S4 may be turned on during a half period of the power transmitted in the non-contact manner, as illustrated in FIG. 13C. For example, the fourth switch S4 may be turned on during a positive half period of the power transmitted in the non-contact manner, and the third switch S3 may be turned on during a negative half period of the power transmitted in the non-contact manner.

Figure 13D:
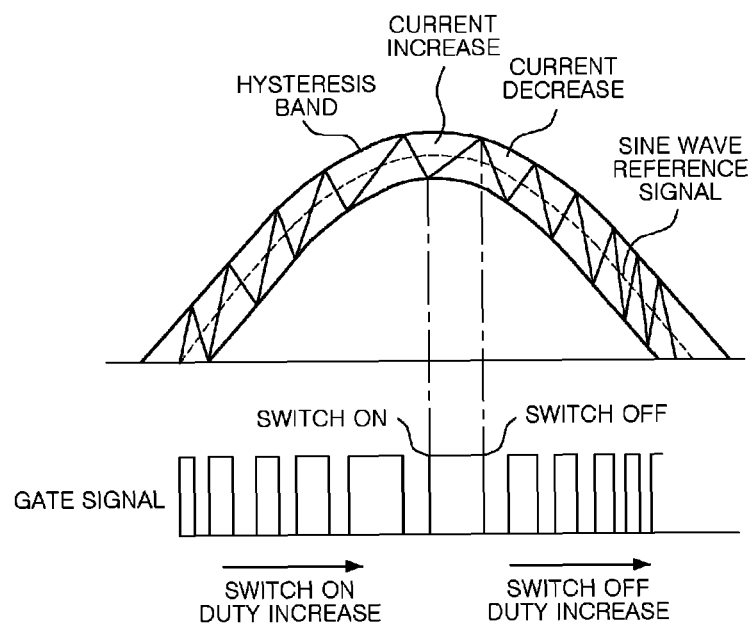

Referring to FIG. 13D, a reference signal required for controlling the output current of the power receiving coil CRx may be controlled using a hysteresis band of an interval between an upper limit and a lower limit of the output current of the power receiving coil CRx.

When a width of the above-mentioned hysteresis band is decreased, ripples of the output current of the power receiving coil CRx may be decreased such that the output current of the power receiving coil CRx may be precisely controlled, while the switching frequencies of the switches S1, S2, S3, and S4 of the rectifying unit La may be increased such that power loss may be increased.

As set forth above, according to exemplary embodiments in the present disclosure, the amounts of power transmitted at the time of charging the battery cells with the power may be adjusted for each of the battery cells depending on the coupling coefficients between the power transmitting coils and the power receiving coils to maintain a balance in power levels between the battery cells or rapidly charge the battery cells with the maximum allowable current.

While exemplary embodiments have been shown and described above, it will be apparent to those skilled in the art that modifications and variations could be made without departing from the scope of the present invention as defined by the appended claims.

What is claimed is:

1. A non-contact type charger comprising:
a plurality of power transmitting coils configured to transmit power in a non-contact manner;
a plurality of switching units connected to the plurality of power transmitting coils, respectively, to switch power to be transmitted by the plurality of power transmitting coils; and
a switching control unit configured to control power switching of the plurality of switching units, depending on coupling coefficients between each of the plurality of power transmitting coils and a plurality of power receiving coils,
wherein the switching control unit calculates the coupling coefficients using a matrix equation to define a relationship between the plurality of power transmitting coils and the plurality of power receiving coils, wherein the switching control unit calculates the coupling coefficients using the following matrix equation, $$\begin{bmatrix} V_{Rx1} \\ V_{Rx2} \\ \vdots \\ V_{RxN} \end{bmatrix} = \begin{bmatrix} C_{11} & C_{12} & \ldots & C_{1N} \\ C_{21} & C_{22} & \ldots & C_{2N} \\ \vdots & \vdots & & \vdots \\ C_{N1} & C_{N2} & \ldots & C_{NN} \end{bmatrix} \begin{bmatrix} V_{Tx1} \\ V_{Tx2} \\ \vdots \\ V_{TxN} \end{bmatrix},$$

and
wherein $V_{Rx1}$ to $V_{RxN}$ indicate voltage levels of power applied to power receiving coils or battery cells of power receiving units Rx1 to RxN, $V_{Tx1}$ to $V_{TxN}$ indicate voltage levels of power applied to power transmitting coils of power transmitting units Tx1 to TxN, and $C_{11}$ to $C_{NN}$ indicate coupling coefficients between the charger and the battery, that is, between the power receiving units Rx1 to RxN and the power transmitting units Tx1 to TxN.

2. The non-contact type charger of claim 1, wherein the switching control unit controls at least one of a voltage level, a switching duty, a switching on-off dead time, and a switching frequency of the power input to each of the plurality of switching units.

3. The non-contact type charger of claim 2, wherein the switching control unit controls at least one of a voltage level, a switching duty, a switching on-off dead time, and a switching frequency of power input to one of the plurality of switching units to differ from at least one of a voltage level, a switching duty, a switching on-off dead time, and a switching frequency of power input to another of the plurality of switching units.

4. The non-contact type charger of claim 1, wherein the switching control unit sequentially turns on/off the power transmitting units Tx1 and Tx2, and calculates the coupling coefficients by searching for a power receiving unit receiving the highest amount of power.

5. The non-contact type charger of claim 1, further comprising a communications unit receiving the coupling coefficients.

6. The non-contact type charger of claim 1, further comprising a communications unit receiving information on the received power,
wherein the switching control unit sets the coupling coefficients on the basis of the information received from the communications unit.

7. A non-contact type charger comprising:
a plurality of power transmitting units each including:
a power unit configured to supply direct current (DC) power,
a switching unit configured to switch the DC power supplied by the power unit,
a power transmitting coil configured to transmit the power in a non-contact manner, depending on the power switching of the switching unit, and
a detecting unit configured to detect a power state change of the power transmitting coil; and
a control unit configured to control the power switching of the switching unit by setting a coupling coefficient between the power transmitting coil and a power receiving coil, depending on a detection result of the detecting unit
wherein the control unit calculates the coupling coefficients using a matrix equation to define a relationship between a plurality of power transmitting coils and a plurality of power receiving coils, wherein the control unit calculates the coupling coefficients using a matrix equation to define a relationship between a plurality of power transmitting coils and a plurality of power receiving coils, wherein the control unit calculates the coupling coefficients using the following matrix equation, $$\begin{bmatrix} V_{Rx1} \\ V_{Rx2} \\ \vdots \\ V_{RxN} \end{bmatrix} = \begin{bmatrix} C_{11} & C_{12} & \ldots & C_{1N} \\ C_{21} & C_{22} & \ldots & C_{2N} \\ \vdots & \vdots & & \vdots \\ C_{N1} & C_{N2} & \ldots & C_{NN} \end{bmatrix} \begin{bmatrix} V_{Tx1} \\ V_{Tx2} \\ \vdots \\ V_{TxN} \end{bmatrix},$$

and
wherein VRx1 to VRxN indicate voltage levels of power a plied to power receiving coils or battery cells of power receiving units Rx1 to RxN, VTx1 to VTxN indicate voltage levels of power applied to power transmitting coils of power transmitting units Tx1 to TxN, and C11 to CNN indicate coupling coefficients between the charger and the battery, that is, between the power receiving units Rx1 to RxN and the power transmitting units Tx1 to TxN.

8. The non-contact type charger of claim 7, wherein the control unit controls at least one of a voltage level, a switching duty, a switching on-off dead time, and a switching frequency of power input to one of the switching units of the plurality of power transmitting units to differ from at least one of a voltage level, a switching duty, a switching on-off dead time, and a switching frequency of power input to another of the switching units.

9. The non-contact type charger of claim 7, wherein the control unit selectively operates one of the plurality of power transmitting units to calculate coupling coefficients between the corresponding power transmitting coil and a plurality of power receiving coils.

10. The non-contact type charger of claim 7, wherein the control unit selectively varies power transmitted by one of the plurality of power transmitting units to calculate coupling coefficients between the corresponding power transmitting coil and a plurality of power receiving coils.

11. The non-contact type charger of claim 7, wherein the detecting unit detects a power state of the power transmitting coil varied depending on a power state change of each of a plurality of power receiving coils receiving the power transmitted by the power transmitting coil.

12. A non-contact type charger comprising:
a plurality of power transmitting coils configured to transmit power in a non-contact manner;
a plurality of switching units connected to the plurality of power transmitting coils, respectively, to switch power to be transmitted by the plurality of power transmitting coils; and
a switching control unit configured to control power switching of the plurality of switching units, depending on coupling coefficients between each of the plurality of power transmitting coils and a plurality of power receiving coils,
wherein the switching control unit calculates the coupling coefficients using a matrix equation to define a relationship between the plurality of power transmitting coils and the plurality of power receiving coils,
wherein the switching control unit calculates the coupling coefficients using the following matrix equation, $$\begin{bmatrix} \Delta V_{Rx1} \\ \Delta V_{Rx2} \\ \vdots \\ \Delta V_{RxN} \end{bmatrix} = \begin{bmatrix} C_{11} & C_{12} & \ldots & C_{1N} \\ C_{21} & C_{22} & \ldots & C_{2N} \\ \vdots & \vdots & & \vdots \\ C_{N1} & C_{N2} & \ldots & C_{NN} \end{bmatrix} \begin{bmatrix} \Delta V_{Tx1} \\ \Delta V_{Tx2} \\ \vdots \\ \Delta V_{TxN} \end{bmatrix}$$

wherein $\Delta V_{Rx1}$ to $\Delta V_{RxN}$ indicate changes in voltage levels of power applied to power receiving coils or battery cells of power receiving units Rx1 to RxN, $\Delta V_{Tx1}$ to $\Delta V_{TxN}$ indicate changes in voltage levels of power applied to power transmitting coils of power transmitting units Tx1 to TxN, and $C_{11}$ to $C_{NN}$ indicate coupling coefficients between the charger and the battery, that is, between the power receiving units Rx1 to RxN and the power transmitting units Tx1 to TxN.

13. The non-contact type charger of claim 12, wherein the switching control unit sequentially varies power transmitted by the power transmitting units Tx1 and Tx2, and calculates the coupling coefficients by searching for a power receiving unit receiving the highest changes in voltage levels of power.

14. A non-contact type charger comprising:
a plurality of power transmitting units each including:
a power unit configured to supply direct current (DC) power,
a switching unit configured to switch the DC power supplied by the power unit,
a power transmitting coil configured to transmit the power in a non-contact manner, depending on the power switching of the switching unit, and
a detecting unit configured to detect a power state change of the power transmitting coil; and
a control unit configured to control the power switching of the switching unit by setting a coupling coefficient between the power transmitting coil and a power receiving coil, depending on a detection result of the detecting unit,
wherein the control unit calculates the coupling coefficients using the following matrix equation, $$\begin{bmatrix} \Delta V_{Rx1} \\ \Delta V_{Rx2} \\ \vdots \\ \Delta V_{RxN} \end{bmatrix} = \begin{bmatrix} C_{11} & C_{12} & \ldots & C_{1N} \\ C_{21} & C_{22} & \ldots & C_{2N} \\ \vdots & \vdots & & \vdots \\ C_{N1} & C_{N2} & \ldots & C_{NN} \end{bmatrix} \begin{bmatrix} \Delta V_{Tx1} \\ \Delta V_{Tx2} \\ \vdots \\ \Delta V_{TxN} \end{bmatrix}$$

wherein $\Delta V_{Rx1}$ to $\Delta V_{RxN}$ indicate changes in voltage levels of power applied to power receiving coils or battery cells of power receiving units Rx1 to RxN, $\Delta V_{Tx1}$ to $\Delta V_{TxN}$ indicate changes in voltage levels of power applied to power transmitting coils of power transmitting units Tx1 to TxN, and $C_{11}$ to $C_{NN}$ indicate coupling coefficients between the charger and the battery, that is, between the power receiving units Rx1 to RxN and the power transmitting units Tx1 to TxN.

* * * * *